US011837705B2

(12) United States Patent
Watanabe et al.

(10) Patent No.: US 11,837,705 B2
(45) Date of Patent: Dec. 5, 2023

(54) PARTITION MEMBER, ASSEMBLED BATTERY AND METHOD FOR CONTROLLING HEAT TRANSFER IN AN ASSEMBLED BATTERY

(71) Applicant: Mitsubishi Chemical Corporation, Tokyo (JP)

(72) Inventors: Yoko Watanabe, Chiyoda-ku (JP); Tomohiro Kawai, Chiyoda-ku (JP); Iwao Soga, Chiyoda-ku (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 17/656,632

(22) Filed: Mar. 25, 2022

(65) Prior Publication Data

US 2022/0223946 A1    Jul. 14, 2022

Related U.S. Application Data

(60) Division of application No. 16/452,587, filed on Jun. 26, 2019, now abandoned, and a continuation of
(Continued)

(30) Foreign Application Priority Data

Dec. 27, 2016   (JP) ................. 2016-254342

(51) Int. Cl.
   *H01M 10/617*   (2014.01)
   *H01M 10/625*   (2014.01)
   (Continued)

(52) U.S. Cl.
   CPC ....... *H01M 10/617* (2015.04); *H01M 10/625* (2015.04); *H01M 10/627* (2015.04);
   (Continued)

(58) Field of Classification Search
   CPC ............ H01M 50/116; H01M 10/617; H01M 10/625; H01M 10/627; H01M 10/651;
   (Continued)

(56) References Cited

U.S. PATENT DOCUMENTS 9,748,598 B2    8/2017  Takahata
2010/0255359 A1  10/2010 Hirakawa
(Continued)

FOREIGN PATENT DOCUMENTS

CN    101842933 A    9/2010
CN    102171883 A    8/2011
(Continued)

OTHER PUBLICATIONS

Machine Translation of WO-2011073425-A1 (Jan. 31, 2023) (Year: 2023).*
(Continued)

*Primary Examiner* — Matthew J Merkling
(74) *Attorney, Agent, or Firm* — Oblon, McClelland, Maier & Neustadt, L.L.P.

(57) ABSTRACT

A partition member has two surfaces in a thickness direction, and separates single cells that make up an assembled battery. When the average temperature of one of the two surfaces exceeds 180° C., a thermal resistance per unit area ($\theta_1$) in the thickness direction satisfies Expression 1 below, and when the average temperatures of both of the two surfaces do not exceed 80° C., a thermal resistance per unit area ($\theta_2$) in the thickness direction satisfies Expression 2 below.

$$\theta_1 \geq 5.0 \times 10^{-3} (m^2 \cdot K/W),$$  (Expression 1)

and $$\theta_2 \leq 4.0 \times 10^{-3} (m^2 \cdot K/W)$$  (Expression 2).

11 Claims, 11 Drawing Sheets

Related U.S. Application Data application No. PCT/JP2017/047090, filed on Dec. 27, 2017.

(51) Int. Cl.

| | | |
|---|---|---|
| *H01M 10/627* | (2014.01) | |
| *H01M 10/651* | (2014.01) | |
| *H01M 10/658* | (2014.01) | |
| *H01M 10/6555* | (2014.01) | |
| *H01M 50/291* | (2021.01) | |
| *H01M 50/204* | (2021.01) | |

(52) U.S. Cl.
CPC ....... *H01M 10/651* (2015.04); *H01M 10/658* (2015.04); *H01M 10/6555* (2015.04); *H01M 50/204* (2021.01); *H01M 50/291* (2021.01); *H01M 2220/10* (2013.01); *H01M 2220/20* (2013.01)

(58) Field of Classification Search
CPC ........... H01M 10/658; H01M 10/6555; H01M 50/291; H01M 50/204; H01M 2220/10; H01M 2220/20

See application file for complete search history.

(56) References Cited

U.S. PATENT DOCUMENTS

| | | | |
|---|---|---|---|
| 2011/0070476 A1 | 3/2011 | Takahashi | |
| 2011/0159340 A1 | 6/2011 | Hu | |
| 2011/0274951 A1 | 11/2011 | Yali | |
| 2011/0293986 A1 | 12/2011 | Kozu | |
| 2012/0028107 A1 | 2/2012 | Sugita | |
| 2012/0148895 A1 | 6/2012 | Fujikawa | |
| 2012/0231317 A1 | 9/2012 | Shimizu | |
| 2013/0071717 A1 | 3/2013 | Muniz | |
| 2013/0071718 A1* | 3/2013 | Cho | H01M 10/6555 429/120 |
| 2013/0189551 A1 | 7/2013 | Imre | |
| 2013/0202924 A1 | 8/2013 | Kwak | |
| 2016/0190634 A1 | 6/2016 | Takahata | |

FOREIGN PATENT DOCUMENTS

| | | | | |
|---|---|---|---|---|
| CN | 102356483 A | 2/2012 | | |
| CN | 102362388 A | 2/2012 | | |
| CN | 102523762 A | 6/2012 | | |
| CN | 102596397 A | 7/2012 | | |
| CN | 103890995 A | 6/2014 | | |
| CN | 105742533 A | 7/2016 | | |
| JP | 2010-061982 | 3/2010 | | |
| JP | 2010-097693 | 4/2010 | | |
| JP | 2010-165597 | 7/2010 | | |
| JP | 4900534 | 3/2012 | | |
| JP | 2013-33723 A | 2/2013 | | |
| JP | 2013-536542 | 9/2013 | | |
| JP | 2013-234244 | 11/2013 | | |
| JP | 5352681 | 11/2013 | | |
| WO | WO-2011073425 A1 * | 6/2011 | .......... | H01M 10/613 |
| WO | WO 2013/005523 A1 | 1/2013 | | |

OTHER PUBLICATIONS

Korean Office Action dated Jul. 26, 2022 in Korean Patent Application No. 10-2019-7019964 (with unedited computer generated English Translation), 14 pages.
European Office Action dated Aug. 11, 2022 in European Patent Application No. 17 886 854.3, 6 pages.
Lin et al., "Epoxy Thermoset Resins with High Pristine Thermal Conductivity", High Voltage, the Institution of the Engineering and Technology, 2017, vol. 2, Issue 3, issue 3, pp. 139-146, XP006076284.
Combined Chinese Office Action and Search Report issued in Chinese Patent Application No. 201780060853.2 dated Jun. 22, 2021 (w/ English Translation).
Extended European Search Report issued in Patent Application No. 17886854.3 dated Dec. 6, 2019.
International Preliminary Report on Patentability and Written Opinion issued in PCT/JP2017/047090 dated Jul. 11, 2019 (English Translation).
International Search Report issued in PCT/JP2017/047090 dated Mar. 27, 2018 (w/ English Translation).
Chinese Office Action issued in Chinese Patent Application No. 201780080853.2 dated Jan. 27, 2022 (w/ Enghlish Translation).
Office Action dated Jun. 19, 2023, in corresponding Korean Patent Application No. 10-2019-7019964 (with English Translation), 13 pages.
Chinese Office Action issued in Chinese Patent Application No. 202211104938.9 dated Jul. 27, 2023, (w/ English translation).

* cited by examiner

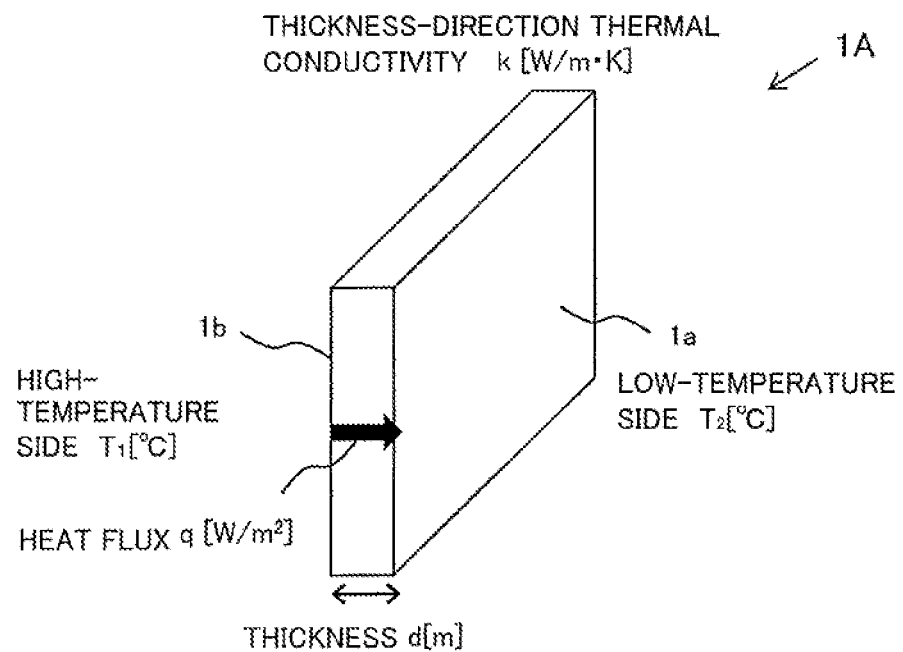
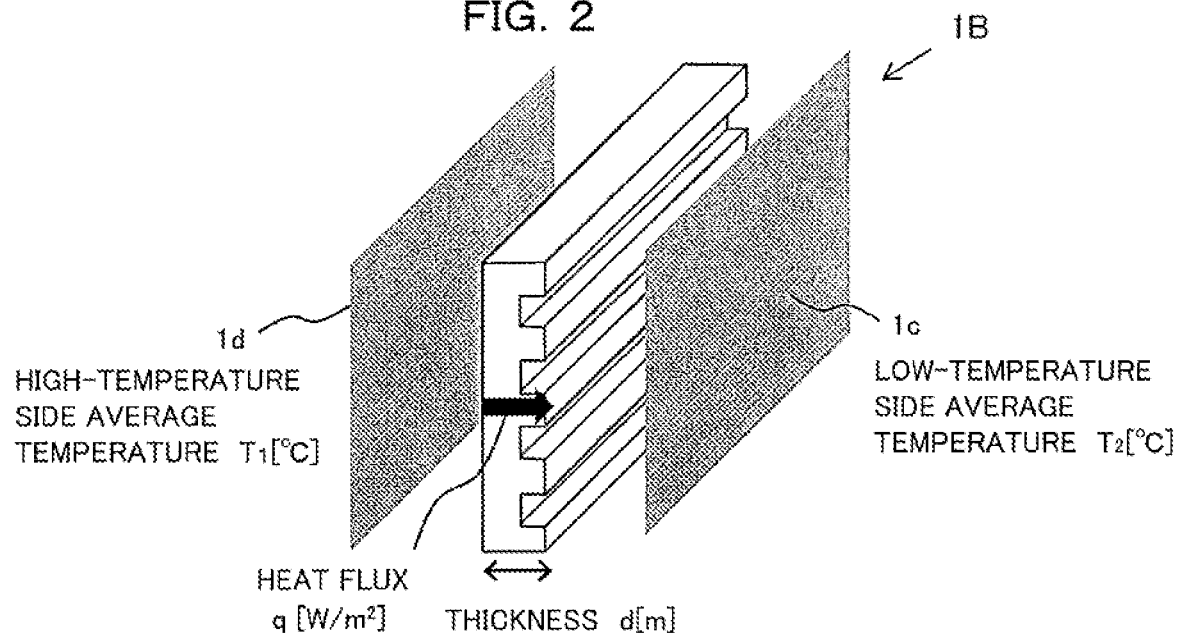

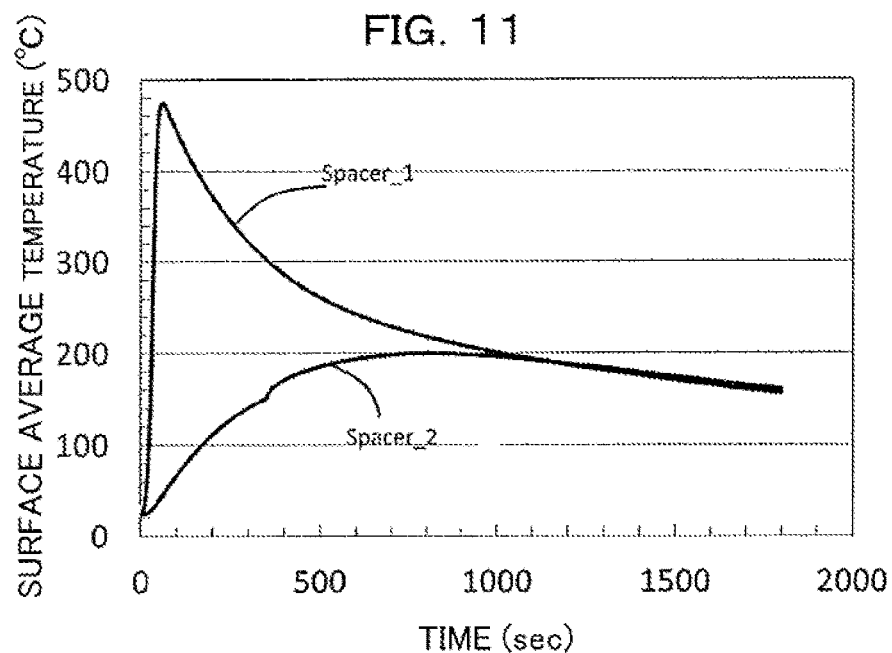
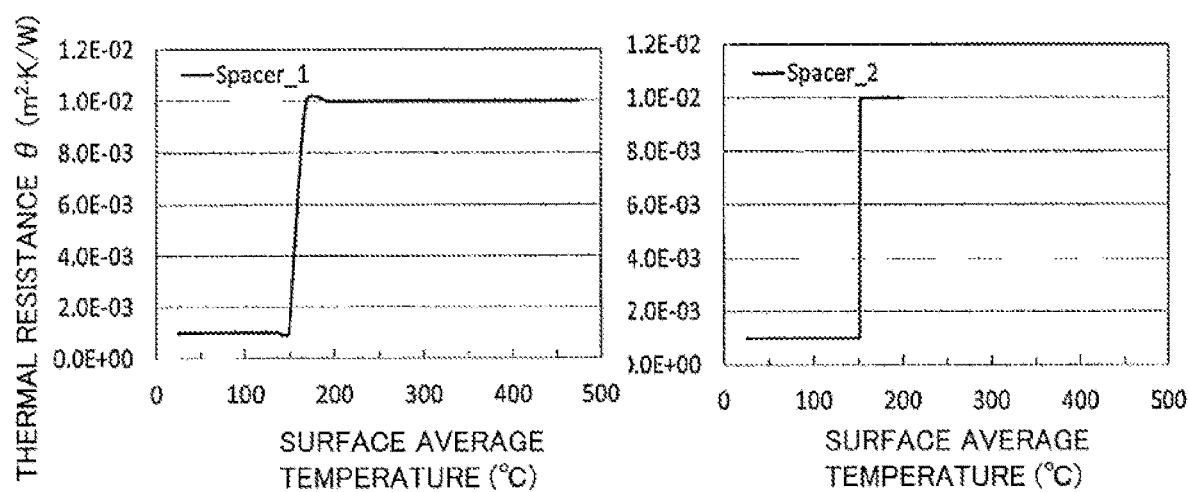

PARTITION MEMBER, ASSEMBLED BATTERY AND METHOD FOR CONTROLLING HEAT TRANSFER IN AN ASSEMBLED BATTERY

CROSS-REFERENCE TO RELATED APPLICATION

This application is a division of U.S. application Ser. No. 16/452,587 filed Jun. 26, 2019, which is a continuation application of International Application PCT/JP2017/047090 filed Dec. 27, 2017 and designated the U.S., and this application is based upon and claims the benefit of priority of the prior Japanese Patent Application No. 2016-254342, filed Dec. 27, 2016, the entire contents of each of which are incorporated herein by reference.

FIELD

The present invention relates to a partition member, to an assembled battery and to a method for rolling heat transfer in an assembled battery.

BACKGROUND

Ongoing research is being conducted on further increasing the energy density of secondary batteries, the use of which as power sources in vehicles or the like has grown dramatically in recent years, with the aims for instance of increasing the degree of freedom in mounting of the secondary battery in the limited space of for instance a vehicle, and extending the cruising range that can be covered with one charging.

A tradeoff tends to arise in secondary batteries between safety and energy density, in that the higher the energy density of the secondary battery, the lower the safety of the battery tends to be. For instance in secondary batteries mounted on electric vehicles with a cruising range of several hundred km, the surface temperature of the battery in the case of damage to the secondary battery, for instance due to overcharge or internal short-circuits, may exceed several hundred ° C., and reach about 1000° C.

Secondary batteries that are used as power sources for instance in vehicles are generally utilized in the form of assembled batteries made up of a plurality of single cells (hereafter also referred to as "cells"); accordingly, in a case where such a temperature region is arrived at due to damage to one of the constituent battery cells, battery cells adjacent thereto may become damaged due to the generated heat, the damage spreading thereupon in a positive-feedback fashion throughout the assembled battery. To prevent such positive-feedback damage to battery cells, technologies have been proposed that involve cooling the damaged battery cells or suppressing flow of heat from damaged battery cells to undamaged battery cells.

For instance PTL 1 addresses a method for cooling an abnormally heated battery. Specifically, PTL 1 discloses a battery module wherein cooling units are provided in which a cooling material is accommodated in the vicinity of single cells, each cooling unit having a sealing portion that is formed through sealing of a sheet-shaped portion, and wherein an openable portion is provided, in part of the sealing portion, which becomes open upon abnormal heating of the single cells.

PTL 2 addresses the structure of a coolant storage part for cooling of a battery having heated up abnormally, and a coolant release mechanism. Specifically, PTL 2 discloses a battery module with: a battery unit made up of a plurality of single cells; a case having a storage part that has an open end on at least one surface, such that the battery unit is accommodated in the storage part; a lid body having an opening, and which covers the open end of the case; and a heat-absorbing member having a heat-absorbing material and an exterior film that encloses the heat-absorbing material, the heat-absorbing member being provided in contact with a side face of the battery unit, wherein the outer film has a multilayer structure that includes a resin layer and a metal film having a higher melting point than the softening temperature of the resin layer, and which melts due to heat generated by the single cells.

PTL 3 discloses a method in which a partition member that is disposed between battery cells is configured out of a meltable base material and a thermosetting resin, such that transfer of heat from an abnormally heated battery cell to an adjacent battery cell is reduced through suppression of heat conduction, by the partition member, due to melting of the base material.

PTL 4 discloses a method wherein a partition member that is disposed between electric storage elements is configured to have a base material formed of a resin, and a foaming agent held in the base material and which undergoes thermal decomposition in response to a rise in temperature derived from generation of heat by the electric storage elements, so that transfer of heat from an abnormally heated battery cell to an adjacent battery cell is suppressed as a result.

PTL 1: Japanese Patent No. 5352681
PTL 2: Japanese Patent No. 4900534
PTL 3: Japanese Patent Application Publication No. 2010-97693
PTL 4: Japanese Patent Application Publication No. 2010-165597

SUMMARY

Results of detailed studies conducted by the inventors on these conventional technologies have revealed that thermal resistance values that are necessary in order to prevent a chain of damage among battery cells have not been sufficiently addressed when considering quantitatively the amount of heat generated by single cells that make up an assembled battery, and the influence on heat transfer by members other than the battery cells that make up the assembled battery.

PTL 1 discloses a detailed study on a method for cooling an abnormally heated battery, but the quantity of heat generated by abnormally heated cells and the cooling capacity of a coolant are not quantitatively addressed. In PTL 2 as well, the quantity of heat generated by abnormally heated battery cells and the cooling capacity of a coolant are not quantitatively addressed.

In PTL 3 changes in the thermal resistance value of a partition member derived from melting of a base material are not quantitatively addressed, and in PTL 4 changes in the thermal resistance of a partition member by a foaming agent that undergoes thermal decomposition, in response to rises in temperature accompanying generation of heat, are likewise not quantitatively addressed. It is deemed that even cases where the thermal resistance of these partition members does change and some of the heat transferred by an abnormally heated battery cell to adjacent battery cells is suppressed, it is however difficult to prevent adjacent battery cells from reaching as a result an abnormal heating state, unless proper design is in place that addresses for instance temperature region change in thermal resistance, and thermal resistance values before and after such a change. The single cells that make up an assembled battery are connected by way of bus bars. Metals, which are good heat conductors, are ordinarily used in bus bars, and hence it is not conceivable that transfer of heat between battery cells can be avoided by means of the bus bars, even upon suppression of transfer of heat between the battery cells due to melting of the base material of the partition members that are disposed between the battery cells.

It is thus an object of embodiments of the present invention to provide a partition member that allows controlling transfer of heat between single cells in an assembled battery having a plurality of single cells, and to provide an assembled battery and a method for controlling an assembled battery.

The inventors focused on thermal resistance values, not addressed in conventional technologies, that are necessary for preventing positive-feedback damage between battery cells, and studied in detail conditions pertaining to the thermal resistance values. As a result, the inventors found that in a partition member which has two surfaces in the thickness direction, and which separates single cells that make up an assembled battery, it is important to control properly a thermal resistance value depending on whether the average temperatures of two surfaces are comparable to cell temperature in a normal state, or whether the average temperatures of the two surfaces are comparable to cell temperature in an abnormal heating state, and arrived at the present invention on the basis of that finding. The embodiments of the present invention is as follows.

[1] A partition member which has two surfaces in a thickness direction, and which separates single cells that up an assembled battery, wherein when the temperature of one of the two surfaces exceeds 180° C., a thermal resistance per unit area ($\theta_1$) in the thickness direction satisfies Expression 1 below; and when the average temperatures of both of the two surfaces do not exceed 80° C., a thermal resistance per unit area ($\theta_2$) in the thickness direction satisfies Expression 2, below, $$\theta_1 \geq 5.0 \times 10^{-3} (m^2 \cdot K/W), \quad \text{(Expression 1)}$$

and $$\theta_2 \leq 4.0 \times 10^{-3} (m^2 \cdot K/W). \quad \text{(Expression 2)}$$

[2] The partition member according to [1], wherein when the average temperature of one of the two surfaces is 180° C. or higher, thermal conductivity in the thickness direction is 2.0×10⁻² W/m·K or more and 2.0 W/m·K or less; and when the average temperatures of both of the two surfaces re 80° C. or lower, thermal conductivity in the thickness direction is 5.0×10⁻² W/m·K or more and 50 W/m·K or less.

[3] The partition member according to [1] or [2], wherein when the thickness of the single cells is denoted by L (mm), thickness in the thickness direction is L/50 mm or more and L/10 mm or less.

[4] The partition member according to any one of [1] to [3] wherein when the average temperature of one of the two surfaces exceeds 180° C. and is 300° C., the thermal resistance per unit area ($\theta_1$) in the thickness direction satisfies Expression 1 below; and when the average temperatures of both of the two surfaces do not exceed 80° C., the thermal resistance per unit area ($\theta_2$) in the thickness direction satisfies Expression 2 below.

[5] An assembled battery, comprising the partition member according to any one of [1] to [4].

[6] An assembled battery, comprising:

a plurality of single cells including a first single cell, a second single cell and a thin single cell; and a first partition member that separate the first single cell from the second single cell, and a second partition member that separates the second single cell from the third single cell, wherein when the second single cell deviates from a normal state due to heat from the first single cell having reached an abnormal heating state, the quantity of heat transmitted from the first single cell to the second single cell via the first partition member is reduced by the first partition member and the quantity of heat transmitted from the first single cell to the third single cell maintaining the normal state is not reduced by the second partition member.

[7] The assembled battery according to [6], wherein the quantity of heat transmitted from the first single cell to the second single cell is reduced through an increase in the thermal resistance per unit area of the first partition member.

[8] The assembled battery according to [6] or [7], wherein even if the second single cell deviates from normal state, the thermal resistance per unit area of the second partition member does not increase and the quantity of heat transmitted from the first single cell to the third single cell is not reduced.

[9] A method for controlling heat transfer in an assembled battery in which single cells are separated by a partition member, wherein the partition member has two surfaces in a thickness direction, one of the surfaces being a first surface opposing a first single cell and the other surface being a second surface opposing a second single cell;

when an average temperature of the first surface does not exceed 80° C., a thermal resistance per unit area ($\theta_2$) in the thickness direction satisfies Expression 2 below, whereby heat from the first single cell transmitted to the second single cell via the partition member; and when the first single cell reaches an abnormal heating state, the second single cell deviates from a normal state due to heat transmitted from the first single cell via the partition member, and the average temperature of the first surface exceeds 180° C. due to heat from the first single cell, then a thermal resistance per unit area ($\theta_1$) in the thickness direction satisfies Expression 1 below, whereby a quantity of heat transmitted from the first single cell via the partition member is reduced, $$\theta_1 \leq 5.0 \times 10^{-3} (m^2 \cdot K/W), \quad \text{(Expression 1)}$$

and $$\theta_2 \leq 4.0 \times 10^{-3} (m^2 \cdot K/W). \quad \text{(Expression 2)}$$

BRIEF DESCRIPTION OF DRAWINGS

FIG. 1 is a diagram illustrating an example of a partition member.

FIG. 2 is a diagram illustrating an example of a partition member having a comb-shaped structure.

FIG. 11 is a graph illustrating the evolution of surface average temperature of partition members in Example 1.

FIG. 12 is a set of graphs illustrating the evolution of thermal resistance of partition members in Example 1.

DESCRIPTION OF EMBODIMENTS

Figure 3:
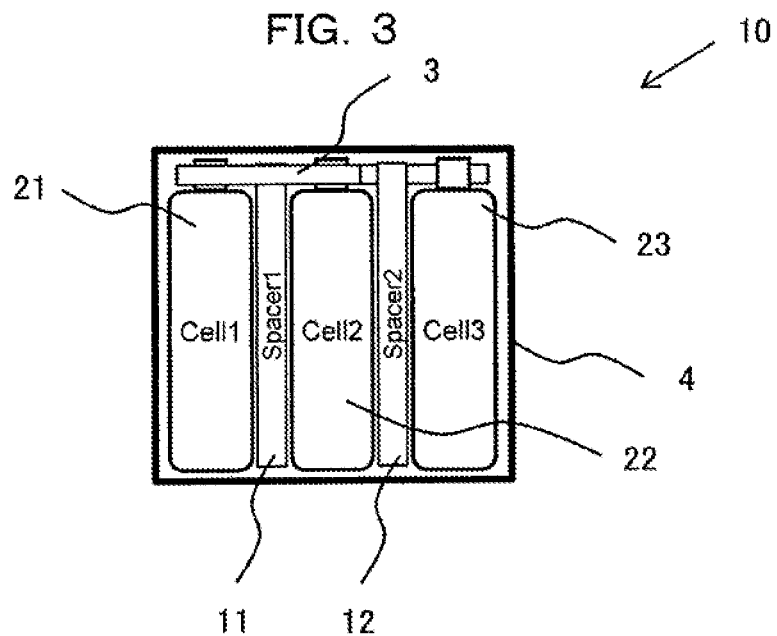
FIG. 3 is a diagram illustrating an example of an assembled battery.

The embodiments of the present invention will be explained next in detail. The explanation below concerning configurational requirements is an example (representative example) of the embodiments of the present invention, but the invention is not limited to the content of the embodiments, so long as the gist of the invention is not departed from.

Partition Member

The partition member according to the present invention is a partition member that separates single cells that make up an assembled battery. The partition member, which separates single cells that make up an assembled battery, has two surfaces in the thickness direction, wherein when the average temperature of one of the two surfaces exceeds 180° C., a thermal resistance per unit area ($\theta_1$) in the thickness direction satisfies Expression 1 below; and when the average temperatures of both of the two surface do not exceed 80° C., a thermal resistance per unit area ($\theta_2$) in the thickness direction satisfies Expression 2 below.

$$\theta_1 \leq 5.0 \times 10^{-3} (m^2 \cdot K/W), \quad \text{(Expression 1)}$$
and
$$\theta_2 \leq 4.0 \times 10^{-3} (m^2 \cdot K/W). \quad \text{(Expression 2)}$$

Preferably, $\theta_1$ is $1.0 \times 10^{-2}$ or greater and more preferably $2.0 \times 10^{-2}$ or greater. Meanwhile, $\theta_2$ is preferably $2.0 \times 10^{-3}$ or smaller and more preferably $1.0 \times 10^{-3}$ or smaller. When the average temperature of one of the two thickness-direction surfaces of the partition member 1 that separates respective single cells that make up an assembled battery exceeds 160° C., preferably, the thermal resistance per unit area ($\theta_1$) satisfies Expression 1 above, and when the average temperatures of both of two surfaces do not exceed 100° C., the thermal resistance per unit area ($\theta_2$) satisfies Expression 2 above.

The partition member separates single cells that make up an assembled battery. FIG. 1 is a diagram illustrating an example of a partition member. FIG. 1 illustrates a rectangular parallelepiped (plate body) partition member (referred to as partition member 1A in the explanation of FIG. 1) having length, width and thickness (depth). The partition member 1A has two surfaces, namely a surface 1a and a surface 1b opposing each other in the thickness direction.

The partition member 1A is disposed between respective single cells that make up an assembled battery, in order to partition the single cells from each other. In a state where the partition member 1A separates single cells from each other, the surface 1a and the surface 1b are brought to a state in which the foregoing oppose respective single cells to be partitioned. Each of the surface 1a and the surface 1b between in a state of being in contact respective opposing single cells, or near respective opposing single cells.

In the example illustrated in FIG. 1 the surface 1a and the surface 1b can be used as "two thickness-direction surfaces that partition single cells making up an assembled battery". Depending on the partitioning scheme according to which each partition member 1A is utilized, one of the "two thickness-direction surfaces that partition single cells making up an assembled battery", may in some instances not oppose a single cell.

In the present invention the thermal resistance per unit area ($\theta$) of a partition member is referred to as heat transfer resistance per unit cross-sectional area of the partition member in the thickness direction. The thermal resistance per unit area ($\theta$) of the partition member can be expressed using the thermal conductivity (k (W/m·K)) in the thickness direction of the material used as the partition member and using the thickness d (m)) of the partition member.

The thermal resistance per unit area ($\theta$) of the partition member 1A illustrated in FIG. 1 will be explained next. To make the explanation simpler, the partition member 1A will be assumed to be formed out of a single material and to have constant density. Herein k (W/m·K) denotes the thermal conductivity of the partition member 1A in the thickness direction and d (m) denotes the thickness of the partition member 1A. Further, $T_1$ (° C.) denotes the average value of surface temperature of the surface 1b the partition member 1A and $T_2$ (° C.) denotes the average value of the surface temperature of the surface 1a.

A surface temperature difference $T_1-T_2$ arises between the surface $1b$ side and the surface $1a$ side of the partition member 1A in a case where $T_2$ is lower than $T_1$. In that case, the heat flow rate (heat flux) q per unit cross-sectional area of the partition member 1A can be given by Expression (1) below.

$$q = k(T_1 - T_2)/d(W/m^2) \qquad (1)$$

The heat flux (q) can be expressed herein Expression (2) below, using the thermal resistance per unit area (θ).

$$q = 1(\theta)(T_1 - T_2) \qquad (2)$$

According to Expressions (1 and (2), the thermal resistance per unit area (θ) can be expressed using the thermal conductivity (k) of the partition member 1A in the thickness direction and the thickness (d) of the partition member. That is the thermal resistance per unit area (θ) can be given by Expression (3) below.

$$\theta = d/k(m^2 \cdot K/W) \qquad (3)$$

The shape (structure) of the partition member 1 is not limited to a rectangular parallelepiped. So long as the partition member 1 is shaped to have a thickness direction, the thermal resistance of the partition member 1 can be expressed by Expression (3) also in a case where the partition member has for instance a comb-type structure, a hollow structure or a lattice structure. The partition member 1 is not limited to being formed out of single material, and may be formed of a combination of a plurality of materials. The thermal resistance per unit area of the partition member 1 can be given by Expression (3) above also in a case where the partition member 1 is formed of a combination of a plurality of materials. To combine materials, for instance two or more materials from among the following can be selected and combined: polyethylene, chlorinated polyethylene, ethylene-vinyl chloride copolymers, ethylene-vinyl acetate copolymers, polyvinyl acetate, polypropylene polybutene, polybutadiene polymethylpentene, polystyrene, poly α-methylstyrene, poly(p-vinyl phenol), ABS resins, SAN resins, AES resins, AAS resins, methacrylic resins, norbornene resins, PVC, acrylic-modified polyvinyl chloride, polyvinylidene chloride, polyallylamine, polyvinyl ether, polyvinyl alcohol, ethylene vinyl alcohol copolymers, petroleum resins, thermoplastic elastomers, thermoplastic polyurethane resins, polyacrylonitrile, polyvinyl butyral, phenolic resins, epoxy resins, urea resins, melafine resins, furan resins, unsaturated polyester resins, diallyl phthalate, guanamine, ketone resins, cellulose acetate, cellophane, cellulose nitrate, acetyl cellulose, nylon, polyamides, polyacetals, polyoxymethylene, polycarbonates, polycarbonate/ABS alloys, polycarbonate/polyester alloys, polyphenylene ether, polybutylene terephthalate, polyethylene terephthalate, polysulfones, polyether sulfones, polyphenylene sulfide, polyarylates, polyamide imides, polyether imides, polyether ether ketones, ultrahigh molecular weight polyethylene, isotactic polystyrene, liquid crystal polymers, polyimides, fluororesins, Teflon (registered trademark), tetrafluoroethylene perfluoroalkoxyvinyl ethers, ethylene tetrafluoroethylene hexafluoride copolymers, polychlorotrifluoroethylene, tetrafluoroethylene-ethylene copolymers, polyvinylidene fluoride, polyvinyl fluoride, polyaminobismaleimide, polytriazine and crosslinked polyamide imides.

FIG. 2 illustrates an example of a partition member 1 (referred to as partition member 1B in the explanation of FIG. 2) having a comb-type structure. As illustrated in FIG. 2, the partition member 1B is formed to have overall a plate-like shape the cross section of which has a comb shape. The partition member 1B as well has two surfaces, namely a surface $1c$ and a surface $1d$ opposing each other in the thickness direction. The surface $1c$ is a surface having stripe-like crenellations, while the surface $1d$ is a flat surface. Accordingly, the cross section resulting from cutting the partition member 1B along a plane in the thickness direction is a comb shape. The surface $1c$ and the surface $1d$ can be treated in the same manner as the surface $1a$ and the surface $1b$.

The thermal resistance per unit area (θ) of the partition member 1B illustrated in FIG. 2 can be worked out as follows. The average temperatures at the surface $1c$ and the surface $1d$ can be used as $T_1$ and $T_2$ in Expression (1) and Expression (2) above. The average value of heat flow rate per unit cross-sectional area of the partition member 1B can be used as the heat flux (q) in Expression (1) and Expression (2) above.

The thermal resistance per unit area (θ) can be expressed using Expression (3) above by using, as the thermal conductivity (k) in Expression (1) and Expression (3), a combined thermal conductivity that is calculated taking into consideration the structure and material types of the partition member 1B. As the thermal resistance per unit area (θ), an effective thermal resistance per unit area, which is calculated with consideration of the structure and material types of the partition member 1B, can be used.

The combined thermal conductivity can be calculated for instance in accordance with the method below. Firstly a thermal resistance (R) of a composite member resulting from combining n types of material having thermal conductivity: $k_n$ (W/m·K), thickness: $d_n$ (m) and thermal resistance: $R_n$ (n=1, 2, ... n) is obtained. When the n types of material are arrayed in series the thermal resistance (R) can be given by Expression (4) below.

$$R = R_1 + R_2 + R_3 + \ldots + R_n \qquad (4)$$

When the n types of material are arrayed in parallel the thermal resistance (R) can be given by Expression (5) below.

$$1/R = 1/R_1 + 1/R_2 + 1/R_3 + \ldots + 1/R_n \qquad (5)$$

A combined thermal conductivity of the composite member in a case where n types of material are arrayed in series will be calculated next. In this case the cross-sectional area ($A_n$) of the n types of material in the heat transfer direction will be assumed to be equal for all the materials. That is, assuming $A_1=A_2=A_3= \ldots =A_n=A$ (m²), the thermal resistance ($R_n$) of each material can then be given by Expression (6) below, using a respective thermal resistance ($\theta_n$) per unit cross-sectional area.

$$R_n = \theta_n/A \qquad (6)$$

Expression (7) below is obtained by rewriting Expression (4) using Expression (6) and Expression (3).

$$R = (\theta_1 + \theta_2 + \theta_3 + \ldots + \theta_n)/A \qquad (7)$$
$$= (d_1/k_1 + d_2/k_2 + d_3/k_3 + \ldots + d_n/k_n)A$$

With κ denoting the combined thermal conductivity of the composite member, this combined thermal conductivity can be given by Expression (8), since the total thickness of the composite member is herein $\Sigma d_n$.

$$R = \left(\sum d_n/\kappa\right)/A \qquad (8)$$

The combined thermal conductivity (κ) can be expressed as follows using Expression (7) and Expression (8).

$$\kappa = \sum d_n / \sum (d_n k_n)$$
$$= (d_1 + d_2 + d_3 + \ldots + d_n)/(d_1/k_1 + d_2/k_2 + d_3/k_3 + \ldots + d_n/k_n)$$

The combined thermal conductivity of a composite member in a case where n types of material are arrayed in parallel will be calculated next. In this case the thickness of the n types of material in the heat transfer direction will be assumed to be equal for all materials. That is, there holds $d_1=d_2=d_3=\ldots=d_n=d$ (m). The thermal resistance ($R_n$) of each material can be expressed as follows using a respective thermal resistance ($\theta_n$) per unit cross-sectional area, with $A_n$ (m$^2$) denoting the respective cross-sectional area of the n types of material in the heat transfer direction.

$$R = \theta_n/A_n \qquad (9)$$

Expression (10) below is obtained by rewriting Expression (5) using Expression (9) and Expression (3).

$$1/R = A_1/\theta_1 + A_2/\theta_2 + A_3/\theta_3 + \ldots + A_n/\theta_n \qquad (10)$$
$$= (A_1 k_1 + A_2 k_2 + A_3 k_3 + \ldots + A_n k_n)/d$$

The combined thermal conductivity (κ) of the composite member can be expressed as given by Expression (11) below, since the total cross-sectional area of the composite member is herein $\Sigma A_n$.

$$R = (d/\kappa)/\sum A_n \qquad (11)$$

The combined thermal conductivity (κ) can be expressed as follows using Expression (10) and Expression (11).

$$\kappa = \sum (A_n k_n) / \sum A_n$$
$$= (A_1 k_1 + A_2 k_2 + A_3 k_3 + \ldots + A_n k_n)/(A_1 + A_2 + A_3 + \ldots + A_n)$$

The combined thermal conductivity can be calculated, even when the partition member 1B is a partition member of comb-shaped structure such as the partition member 1B, or a partition member of hollow structure, lattice structure or the like, on the basis of the thermal conductivity of air, being the material of hollow portions, and on the basis of the thickness and cross-sectional area of the hollow portions.

When the average temperature one of the two thickness-direction surfaces of the partition member 1 the partition the single cells that make up an assembled battery (for instance any one of surfaces 1a to 1d) exceeds 180° C., then the thickness-direction thermal conductivity is preferably 2.0× 10$^{-2}$ W/m·K or more and 2.0 W/m·K or less, and when the average temperature of that surface (for instance any one of surfaces 1a to 1d) does not exceed 80° C., the thickness-direction thermal conductivity is preferably 5.0×10$^{-2}$ W/m·K or more and 50 W/m·K or less.

Preferably, the thickness of the partition member 1 preferably L/50 mm to L/10 mm, where L is the thickness of each single cell that makes up the assembled battery. A conceivable range of the thickness (L) of each single cell that makes up the assembled battery assembled battery is ordinarily herein 10 mm≤L≤100 mm, preferably 15 mm≤L≤80 mm.

Whether a given partition member is suitable as the partition member of the present invention or not can be checked in the manner described below.

1. Determination of the Thermal Resistance ($\theta_1$)

1-1) The barycenter of the partition member to be checked is worked out. A perpendicular line is drawn from the barycenter to one face of the partition member, and the obtained intersection point is taken as a first point. Heating is then performed so that entire surface that encompasses the first point is heated to 160° C. The heating method is not particularly limited, so long as heating can be performed through control of the temperature so that the entire surface including a given first point is at 160° C. to 300° C.

1-2) Then a point lying on the other surface, at a position that is plane-symmetrical to the first point with respect to a division plane resulting from bisecting the partition member in the thickness direction, with the first point as a reference, is taken herein as a second point.

1-3) The temperature of the surface including the first point is raised from 160° C. to 300° C., on the basis of the first point and the second point. The thermal resistance ($\theta_1$) is then worked out in accordance with the method described above, when the temperature of the entire system reaches a steady state, at temperatures of 160° C. 180° C., 210° C., 240° C., 270° C. and 300° C.

2. Determination of Thermal Resistance ($\theta_2$)

2-1) The entire surface including the first point is heated at 100° C. The heating method is not limited, so long as heating can be performed through control of the temperature so that the entire surface including the above first point lies in the range of 20° C. to 1000° C.

2-2) The second point is determined in the same way as in 1-2).

2-3) The temperature of the surface including the first point is lowered from 100° C. to 20° C., on the basis of the first point and the second point. The thermal resistance ($\theta_2$) is then worked out in accordance with the method described above. When the temperature of the entire system reaches a steady state, at temperatures of 80° C., 60° C., 40° C. and 20° C.

3. Verification of the Partition Member 3-1) It is checked whether Expression 1 is satisfied or not at each temperature higher than 180° C. whether Expression 2 above is satisfied or not at each temperature lower than 80° C., using the values of thermal resistance worked out in 1-3 and 2-3) above. It is check whether Expression 1 and Expression 2 are satisfied or not, at each temperature, to thereby verify whether a given partition member corresponds or not to the partition member of the present invention. As described above, preferably the partition member of the present invention satisfies Expression 1 at each temperature higher than 160° C., and satisfies Expression 2 at each temperature lower than 100° C.

Assembled Battery

The partition member 1 is one constituent element that makes up an assembled battery. The assembled battery that can be used in the present invention is utilized in a battery pack mounted for instance in electric vehicles (EVs), hybrid electric vehicles (HEVs), plug-in hybrid electric vehicles (PHEVs), electric heavy equipment, electric bikes, electrically assisted bicycles, ships, aircraft, trains, uninterruptible power supplier (UPSs), household storage systems, and storage battery systems for stabilization of electric power systems that utilize renewable energy such as wind power, solar power, tidal power, and geothermal power. However, the assembled battery can also be used as a power source for supplying power to equipment other than the abovementioned EVs and so forth.

FIG. 3 is a diagram illustrating an example of an assembled battery. FIG. 3 illustrates a three-cell connected simple battery pack as the assembled battery 10. The assembled battery is formed through connection of a number of single cells (also referred to as cells) corresponding to the desired output power, in series, in parallel, or in a combination thereof. The number of cells is set as appropriate depending on the requested power. In the example of FIG. 3 the single cells are connected in series, with a partition member disposed between respective single cells.

The assembled battery 10 in the example of the assembled battery 10 depicted in FIG. 3 has: a cell 21 (Cell 1: first single cell) a cell 22 (Cells 2: second single cell) and a cell 23 (Cell 3: third single cell); as well as a partition member 11 (Spacer 1: first partition member) and a partition member 1 (Spacer 2: second partition member) disposed between respective cells and which partition the cells from each other. The assembled battery 10 is provided with bus bars 3 and a case 4. When not distinguished from each other, the partition member 11 and the partition member 12 will be referred to as partition members 1 in the explanation below. When not distinguished from each other, likewise, the cell 21, cells 22 and cell 23 will be notated as cells 2. In the present invention, the first single cell, second single cell and third single cell, as well as the first partition member and the second partition member, obey a relative positional relationship such as the one illustrated in FIG. 3. In a case where a given single cell reaches an abnormal heating state, that single cell is regarded as the first single cell, to determine thus the second single cell, third single cell, first partition member and second partition member.

Cells/Single Cells

The cells 2 are each a lithium ion secondary battery cell provided for instance with a positive electrode and a negative electrode capable of storing and releasing lithium ions, and with an electrolyte. Besides lithium ion secondary battery cells, secondary batteries such as lithium ion all-solid-state battery cells, nickel-hydride battery cells, nickel cadmium battery cells and lead storage battery cells can be used.

Partition Member

A partition member explained on the basis of FIG. 1 and FIG. 2 can be used herein as each partition member 1.

Bus Bars and Case

Each bus bar 3 is a conductor rod used in order to supply power outputted from respective cells to a load (for instance a motor), and is for instance formed of a conductor such as aluminum. The case 4 accommodates the partition members 1 and the cells 2. The case 4 can be formed for instance of a metal, a resin (for instance polypropylene), or of a combination of metal and a resin. The cells 2 having the partition members inserted between cells may be clamped by end plates that are in turn connected by connecting plates, in such a manner that the cells 2 and the partition members 1 become fixed to each other.

Generation and Transfer of Heat in the Assembled Battery

In some instances, part or the entirety of the chemical substances that make up for instance the electrolyte solution and the electrodes that constitute the cells 2 undergo decomposition reactions inside the cells 2 with generation of heat as a result of which the temperature in the cell 2 increases and partial regions or the entirety of the cells 2 may reach a temperature of 200° C. or higher. This state is referred to as an "abnormal heating state".

It is known that, generally, the stability of the crystal structure after lithium removal by charging exerts a significant influence on the safety of the positive electrode material, from among the materials that make up the cells 2. Materials such as $LiCoO_2$, $Li(Ni_{1/3}Mn_{1/3}Co_{1/3})O_2$ and $Li(Ni_{0.8}Co_{0.15}Al_{0.05})O_2$ that are generally used as positive electrode materials undergo crystal collapse with release of oxygen, at high temperatures in a charged state. The oxygen released by the positive electrode gives rise for instance to oxidation of the electrolyte solution, accompanied with a sudden exothermic reaction. Reported structural analyses using synchrotron radiation have revealed that crystal phase transitions occur at about 200° C. in the above positive electrode material types. Accordingly, an instance where part or the entirety of the cells 2 is at 200° C. or above signifies herein that crystal collapse of the positive electrode is in progress, i.e. that the cells 2 are in a thermal runaway state (Reference 1: High-Safety Technologies and Materials in Lithium Ion Batteries, CMC Publishing Co., Ltd., p. 44; Reference 2: J. Dahn et al., Electrochemistry Communication, 9, 2534-2540 (2007); Reference 3: Hiroki KOBAYASHI, "Synchrotron Radiation-Based Evaluation and Analysis Technologies for Positive Electrode Materials in Lithium Ion Secondary Batteries" Spring-8 Promotion Association, Workshop of the Glass and Ceramics Research Society (2nd session) (2011)).

Regarding the safety of the negative electrode material from among the materials that make up the cells 2, a charging negative electrode (lithium-intercalated carbon negative electrode) exhibits basically the same strong reducibility as that of metallic lithium; as is known, a coating film forms thus on the negative electrode surface upon reaction with the electrolyte solution, with further reactions being inhibited by that coating film. Therefore the chemical composition, structure and thermal stability of this protective coating film exerts a significant influence the thermal stability of the charging negative electrode at the time of rises in temperature. Reactions between the charging negative electrode and the electrolyte solution are ordinarily explained by the formation of a protective coating film and by ensuing explosive reductive decomposition reactions arising from breakdown of that film. It has been reported that the protective film formation reaction on the negative electrode proceeds generally from around 130° C., and the subsequent coating film decomposition reaction proceeds at about 200° C., eventually leading to an explosive reductive decomposition reaction. In consequence, an instance where part or the entire area of the cells 2 is at 200° C. or above denotes ongoing breakdown of the coating film on the negative electrode surface, i.e. indicates that cells 2 are in a thermal runaway state (Reference 4: Battery Handbook, 1st Edition Ohm Co., p. 591; Reference 5: Cutting-Edge High-Safety Technologies and Evaluation Technologies in Lithium Ion Batteries, CMC Publishing Co., Ltd., p. 90).

A state in which a chemical substance constituting for instance the electrolyte solution or the electrodes that make up the cells 2 does not elicit a decomposition reaction at or above a given heat generation rate in the interior of the cells 2 will be referred to herein as a "normal state". The heat generation state in the cells 2 can be evaluated by ARC (Accelerating Rate Calorimetry), which is a means for measuring quantitatively thermal behavior during self-heating decomposition, under adiabatic conditions, of a reactive chemical substance. According to the definition by Dahn et al., as a dependable yardstick, a self-heating reaction is progressing inside a cell when the heating rate observed by ARC exceeds in 0.04° C./min (Reference 6: Dahn et al., Electrochimica Acta, 49, 4599-4604 (2004)). Cells 2 in a normal state will be referred to as "single cells maintaining a normal state", and cells 2 deviating from the normal state but not having reached an abnormal heating state will be referred to as "single cells deviating from the normal state". Heat generated inside the cells 2 is transmitted to other cells 2 via various transmission paths.

Cells 2 in a normal state will be referred to as "single cells maintaining normal state", and cells 2 deviating from the normal state but not having reached an abnormal heating state will be referred to as "single cells deviating from the normal state". Heat generated inside the cells 2 is transmitted to other cells 2 via various transmission paths.

Figure 4:
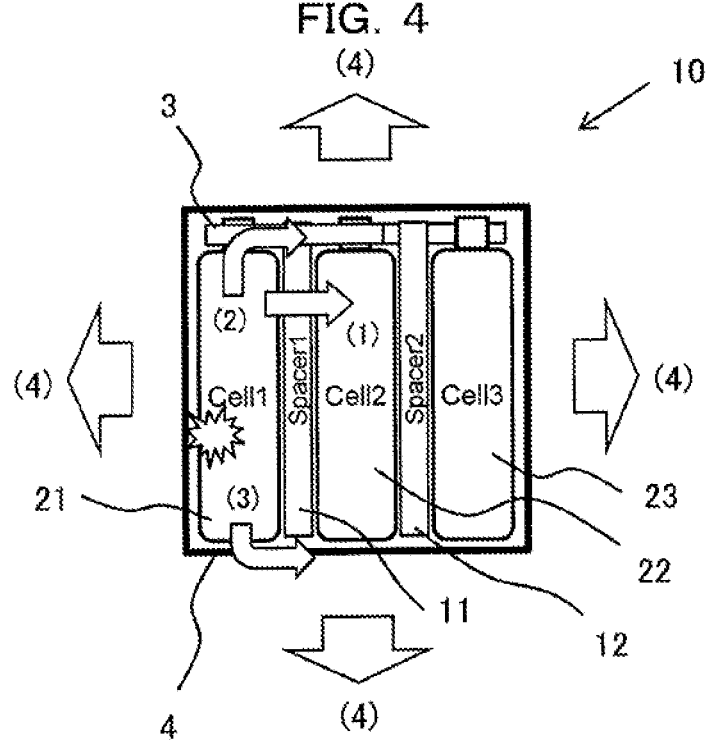
FIG. 4 is a diagram illustrating an example of heat transfer paths in an assembled battery.

FIG. 4 is a diagram illustrating an example of heat transfer paths in an assembled battery. In a case where in the example of FIG. 4 the left-end cell 21 that makes up the assembled battery 10 undergoes abnormal heating, the heat generated by the cell 21 is transmitted to other cell 22, 23 via: (1) the partition member 11 disposed between the cells, (2) the bus bars 3, and (3) the case 4 of the assembled battery 10 in contact with the cells 2; in addition, (4) the heat is also dissipated out of the case of the assembled battery 10.

The upper limit of a surface average temperature envisaged for a case where the cells 2 in contact with or in the vicinity of partition members 1 deviate from the normal state but have not reached an abnormal heating state is set herein to 180° C. It is known that the meltdown temperature of generic separator materials is 160° C. to 200° C. When the surface average temperature of the cells 2 exceeds 180° C., therefore, there is a risk of meltdown of part of the generic separator material that makes up the cells 2, leading to an abnormal heating state. When the average temperature of one of the two thickness-direction surfaces of a partition member 1 that separates respective cells 2 constituting the assembled battery 10 exceeds 180° C., heat transfer through the partition member 1 can be limited, and spread of burning to cells 2 in contact with or is the vicinity of the partition member 1 can be suppressed, by performing control such that the thermal resistance ($\theta_1$) satisfies (Expression 1) above. The material of generic separator materials is for instance polyethylene or polypropylene (Reference 7: Japanese Patent Application Publication No. 2013-35293 and Reference 8: Japanese Patent Application Publication No. 2015-208894).

The upper limit of surface average temperature envisaged for an instance where cells 2 in contact with or in the vicinity of partition members 1 do not deviate from the normal state is set herein to 80° C. The boiling points of generic electrolyte solution components are 90° C. or higher, as given in Table 1. Generic electrolyte solution components include for instance ethylene carbonate (EC) diethyl carbonate, dimethyl carbonate (DMC) and ethyl methyl carbonate (EMC). If the surface average temperature of the cells 2 is lower than 80° C. there ensues thus no boiling of the generic electrolyte solution itself that makes up the cells 2. When the average temperatures of both of the two thickness-direction surfaces of a partition member 1 that separates respective single cell making up the assembled battery are lower than 80° C., control is performed so that the thermal resistance ($\theta_2$) satisfies (Expression 2) above, to thereby promote heat transfer via the partition members 1. When all cells 2 are in a normal state, an effect can be expected to be brought out whereby the temperatures among the cells 2 in the assembled battery 10 are equalized and degradation of the cells 2 derived from temperature unevenness is reduced, since the heat transfer resistance of the partition members 1 is herein lower than that of conventional members.

TABLE 1

| | | EC | DMC | EMC | DEC |
|---|---|---|---|---|---|
| Density | g/ml | 1.385 | 1.063 | 1.007 | 0.970 |
| Molecular weight | g/mol | 88.06 | 90.08 | 104.11 | 118.13 |
| Boiling point | ° C. | 238 | 90 | 108 | 127 |

Means for Controlling Thermal Resistance Per Unit Area ($\theta$)

A means for controlling the thermal resistance per unit area ($\theta$) depending on the surface temperature of the partition members 1 will be explained next. Firstly a material A and a material B that make up the partition members 1 will be illustrated below.

The thermal resistance per unit area ($\theta$) of the material A satisfies (Expression 1) above. The material A is set to have thermal conductivity: $k \leq 0.20$ (W/m·K) and thickness: d=1.0 (mm). That is, the thermal resistance per unit area is: $\theta = d/k \geq (1.0 \times 10^{-3})/0.20 = 5.0 \times 10^{-3}$ ($m^2 \cdot K/W$). The material A is for instance a resin plate made of polycarbonate or butyl rubber.

The thermal resistance per unit area (θ) of the material B satisfies (Expression 2) above. The material B is set to have thermal conductivity: k≥0.25 (W/m·K) and thickness: d=1.0 (mm). That is, the thermal resistance per unit area is: θ=d/k≤(1.0×10⁻³)/0.25=4.0×10⁻³ (m²·K/W). The material B is for instance a ceramic, a glass plate or polyethylene, in solid form, or water, ethylene glycol or glycerin, in liquid form.

Figure 5:
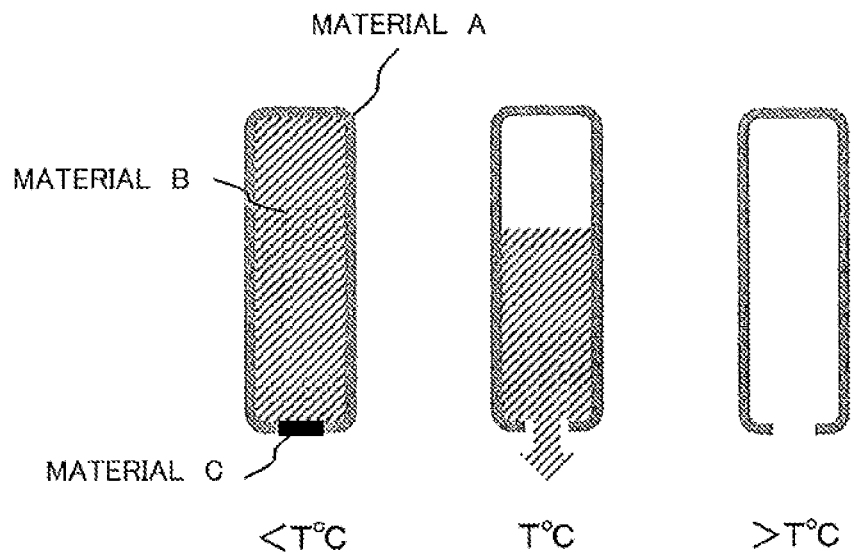
FIG. 5 is an example of a bag-like structure, being an example of an embodiment of the present invention.

Two examples are illustrated below of a partition member 1 in which the thermal resistance per unit area (θ) satisfies (Expression 1) at or above a temperature T (° C.), while satisfy (Expression 2) below the temperature T (° C.). In the first example, the partition member 1 has a substantially rectangular parallelepiped bag-like structure (FIG. 5), of hollow interior, made up of the material A having a melting point at a temperature higher than T (° C.). The interior of the bag-like structure is filled with the material B, which is liquid state at T (° C.) The lower face of the bag-like structure is provided with an opening through which the interior of the bag-like structure communicates with the exterior. The opening is closed by a plug made of a material C having for instance a melting point around T (° C.). The partition member 1 is designed so that when the plug made of the material C melts, at around T (° C.), an opening becomes formed through which the material B that fills the interior flows down to the exterior. The outer shape of the bag-like structure may be other than rectangular parallelepiped shape. In FIG. 5 an opening is provided at the lower face of the bag-like structure, but the opening may be provided at a side face, so long as the opening lies at a position at which the material B can flow down out of the bag-like structure. The partition member 1 may have a structure formed through juxtaposition of multiple bag-like structures described above, each filled with the material B, in the transversal direction or the longitudinal direction. The plug is not necessarily essential herein. The melting point of the material C may be similar or lower than that of the material B. The plug may in some instances be made of the material B. The material B need no necessarily be liquid at T (° C.), and may be in a fluid state other than liquid.

The thermal resistance per unit area (θ) satisfies (Expression 2) thanks to the material B inside the bag-like structure, when the surface temperature of such a partition member 1 having a bag-like structure is lower than T (° C.). When the surface temperature of the partition member 1 is equal to or higher than T (° C.), the thermal resistance per unit area (θ) of the partition member 1 satisfies (Expression 1), given that the material flows down out of the bag-like structure whereupon the partition member 1 is now made up of the material A.

Figure 6:
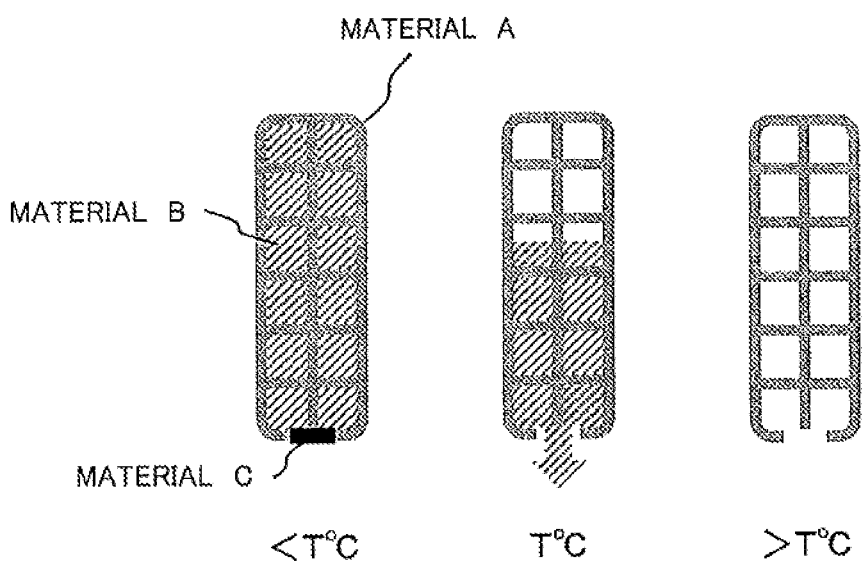
FIG. 6 is a variation of a bag-like structure, being an example of an embodiment of the present invention.

A second example will be explained next. In the second example the partition member 1 has a structure (FIG. 6) in which a lattice-like frame is provided inside the bag-like structure of FIG. 5. The interior of the bag-like structure is filled with the material B, which is liquid at T (° C.), at a portion other than the frame, the lower face of the bag-like structure being closed off by a plug formed of the material C that has a melting point around T (° C.). The partition member 1 is designed so that in a case where the plug formed of the material C melts at around T (° C.), the material B that fills the space portions of the bag-like structure flows down to the exterior, through the opening that becomes formed upon melting of the plug. The frame has the effect of maintaining the rigidity (strength) of the bag-like structure when the material B flows out. In a case where the surface temperature is lower than T (° C.) in such a partition member 1 having a bag-like structure, the thermal resistance per unit area (θ) satisfies (Expression 2) thanks to the material B that filters the space portions of the bag-like structure. In a case where the surface temperature of the partition members 1 is equal to or higher than T (° C.), the thermal resistance per unit area (θ) of the partition members 1 satisfies (Expression 1), given that the material B flows down out of the bag-like structure whereupon the partition members 1 is now made up of the material A.

Control of Heat Transfer Between Cells

Transfer of heat between the cells 2 that make up the assembled battery 10 is controlled in such a manner so as not to reduce the quantity of heat transmitted from cells 2 having reached an abnormal heating state to cells a maintaining a normal state, without mediation of electrode bodies of cells 2 deviating from the normal state, or the quantity of heat transmitted from cells 2 deviating from the normal state to cells 2 maintaining the normal state, while reducing the quantity of heat transmitted from cells 2 having reached an abnormal heating state to the cells 2 deviating from the normal state. The electrode bodies of the cells 2 are structures having electrodes, separators and electrolyte solutions, i.e. are bodies of respective cells.

In FIG. 4, it will be assumed for instance that the cell 21 has reached an abnormal heating state, the cell 22 deviates from the normal state, and the cell 23 maintains the normal state. In this case, control is performed so that the quantity of heat transmitted from the cell 21 to the cell 22 is reduced, and so as not to reduce the quantity of heat transmitted from the cell 21 to the cell 23 without mediation of the electrode body of the cell 22, or the quantity of heat transmitted from the cell 22 to the cell 23.

Transfer of heat among the cells 2 can be controlled on the basis of a switching function of the partition members 1. Specifically, the quantity of heat that is transmitted to the cell from among the quantity of heat generated by the cell 21, is reduced through an increase in the heat transfer resistance of the partition member 11 disposed between the cell 22 deviating from the normal state and the cell 21 having reached an abnormal heating state. Also, by not increasing the heat tray transfer resistance of the partition member 12 that is disposed between the cell 22 deviating from the normal state and the cell 23 maintaining the normal state, the quantity of heat transmitted from the cell 22 to the cell 23, and the quantity of heat transmitted to the cell 23, without mediation of the electrode body of the cell 22, from among the quantity of heat generated by the cell 21 are not reduced. The quantity of heat transmitted to the cell 23 without mediation of the electrode body of the cell 22, from among the quantity of heat generated by the cell 21, is transmitted out of the partition members 1 via the structures of the cells 2 and of the assembled battery 10 (for instance the bus bars 3 and outer wall of the case 4), excluding the electrode body of the cell 22.

By virtue of the partition members 1 of the present embodiment, thus, the quantity of heat generated by cell 21 having reached an abnormal heating state is controlled to be transmitted to the cell 23 maintaining a normal state, while reducing the quantity of heat that is transmitted the cell 22 deviating from the normal state, so that the temperatures of the cells 2 in the assembled battery 10 are equalized. This allows as a result preventing that an abnormal heating state should be reached by cells 2 other than those cells 2 that have reached abnormal heating state.

EXAMPLES

The present invention will be described next in further detail by way of examples, but these should not be construed as limiting the invention thereto in any way.

In the following examples and comparative examples attention has been focused on heat transfer mediated by partition members 1 disposed between cells, among heat transfer paths from abnormally heated cells to other cells, to assess the feasibility of suppressing spread of burning between cells thanks to the partition members 1. As an example of an assembled battery to be evaluated there was constructed the three-cell linked simplified battery model in a two-dimensional coordinate system illustrated in FIG. 3. A heat generation quantity of $1.3 \times 10^9$ ($J/m^3$), corresponding to occurrence of thermal runaway in the cell 21 on the left end (total heat generation quantity estimated on the basis of an evaluation of the quantity of heat of cells 2 that utilize NMC-based positive electrodes), was applied to the left-end cell 21, and heat conduction equations were solved by a finite element method, under the conditions given in respective example and comparative examples, to estimate the temperature in each cell 2, as well as the surface average temperature and thermal resistance per unit area of each partition member 1. Analyses were performed drawing on References 9 and 10 below, using COMSOL Multiphysics which is a general-purpose physical simulation software developed by COMSOL AB. The paths explained in FIG. 4 are conceivable herein as heat transfer paths between the cells (Reference 9: Japanese Patent Application Publication No. 2006-010648; Reference 10: R. M. Spotnitz et al., J. Power Sources 163, 1080-1086, (2007)).

In FIG. 3 there were estimated the temperatures in the interior of the adjacent cell 22 and cell 23, as well as the surface average temperature and thermal resistance per unit area of the partition members 1, upon abnormal heating of the left-end cell 21, and there was evaluated the effect for instance of suppressing spread of burning on the basis of changes in the heat transfer resistance of the partition members 1. The temperature in the interior of each cell 2 was assumed to be the temperature obtained by measuring the average temperature in the interior of respective electrode bodies (structure including electrodes, separators and electrolyte solutions).

Comparative Example 1

In Comparative example 1 the partition members 1 were assumed to be made of a general resin such as polypropylene (PP), with thickness set to 1 mm and thermal conductivity set to 0.24 W/m·K. The bus bars 3 were assumed to be made of aluminum, with thermal conductivity set to 237 W/m·K. The case 4 was assumed to be made of a general resin such as polypropylene, with thermal conductivity set to 0.24 W/m·K. Under these conditions there were estimated the temperature inside each cell 2, as well as the surface average temperature and thermal resistance per unit area of each partition member 1.

Figure 7:
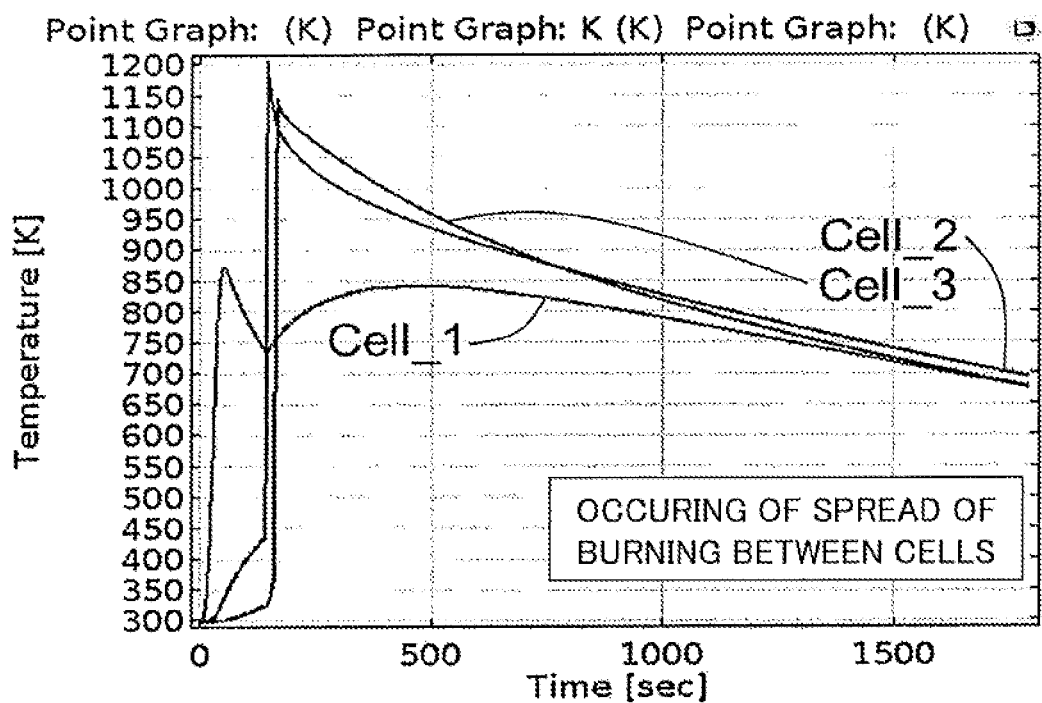
FIG. 7 is a graph illustrating changes in temperature in the interior of cells in Comparative example 1.

FIG. 7 is a graph illustrating changes in temperature in the interior of the cells in Comparative example 1. The vertical axis represents absolute temperature (K) in the interior of the cells 2, and the horizontal axis represents the time (seconds) elapsed since the cell 21 has reached an abnormal heating state. The graph suggests that after about 150 seconds have elapsed since the cell 21 reached an abnormal heating state the temperature in the interior of the cell 22 and the cell 23 exceeds 1000K, with spreading of burning from the abnormally heated cell 21 to the cell 22 and the cell 23.

Figure 8:
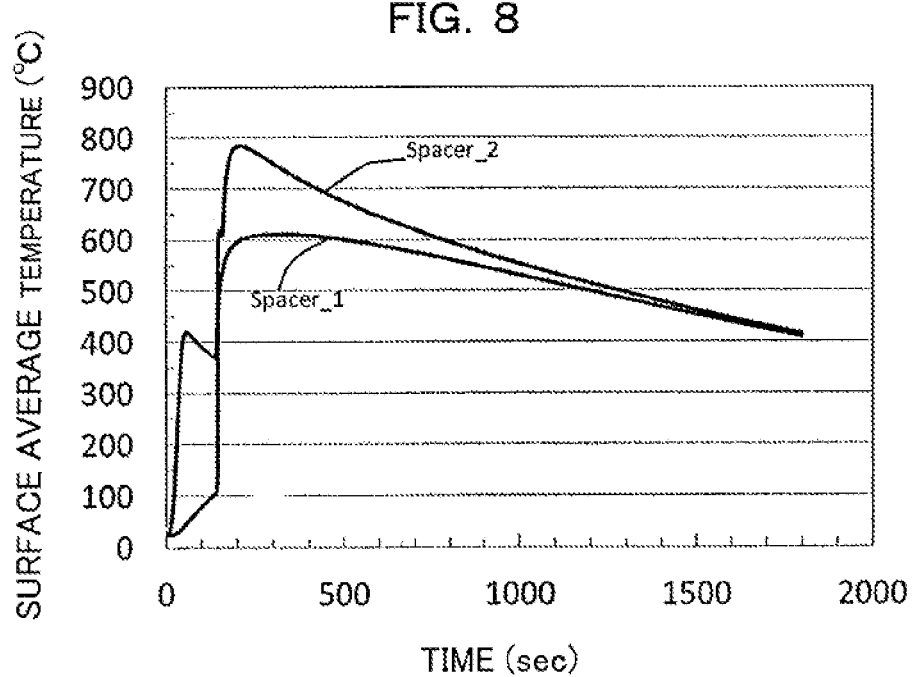
FIG. 8 is a graph illustrating the evolution of surface average temperature of partition members in Comparative example 1.

FIG. 8 is a graph illustrating the evolution of surface average temperature of partition members in Comparative example 1. The average temperature at the surface of the partition members, on the side of the abnormally heated cell 21, was taken herein as the surface average temperature of each partition member 1. The vertical axis represents the surface average temperature (° C.) of the partition members 1 and the horizontal axis represents the time (seconds) after the cell 21 has reached an abnormal heating state. It was estimated that immediately after the cell 21 reaches an abnormal heating state, the surface average temperature of the partition member 11 (Spacer 1) rises rapidly and reaches 400° C., and after about 150 second have elapsed, also the surface average temperature of the partition member 12 (Spacer 2) rises rapidly and exceeds 700° C.

Figure 9:
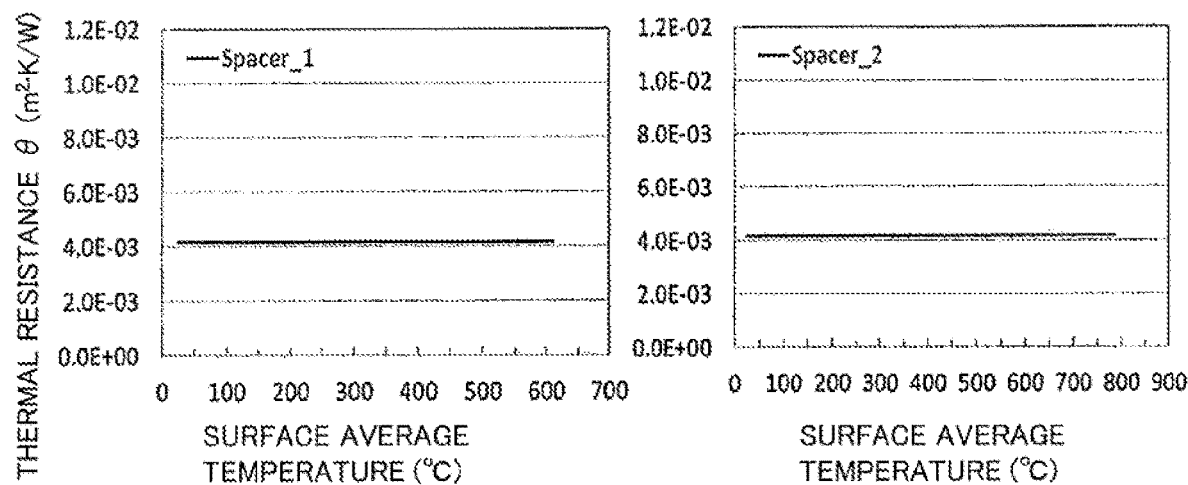
FIG. 9 is a set of graphs illustrating the evolution of thermal resistance of partition members in Comparative example 1.

FIG. 9 is a set of graphs illustrating the evolution of thermal resistance per unit area of the partition members in Comparative example 1. The vertical axis represents thermal resistance per unit area ($m^2 \cdot K/W$) and the horizontal axis represents the surface average temperature (° C.) of the respective partition members 1. The value of thermal resistance per unit area ($\theta_1$) at a surface average temperature of 190° C. of the partition member 11 (Spacer 1) and of the partition member 12 (Spacer 2) was $4.2 \times 10^{-3}$ $m^2 \cdot K/W$, and the value of thermal resistance per unit area ($\theta_2$) at an average temperature of 70° C. was $4.2 \times 10^{-3}$ $m^2 \cdot K/W$. That is, the partition members 1 in Comparative example 1 fail to satisfy the conditions of (Expression 1) and (Expression 2) described above pertaining to thermal resistance per unit area.

Example 1

In Example 1, the partition members 1 were assumed to be high-performance partition members 1 having a switching function whereby thermal conductivity changes at the point in where the surface average temperature of the partition members 1, on the side of abnormally heated cell, reaches a predetermined temperature. The thickness of the partition members 1 was set to 1.0 mm. Various conditions pertaining to the bus bars 3 and the case 4 were set to be identical to those in Comparative example 1.

The partition members having a switching function can be prescribed to have each a structure wherein for instance a substance being in a liquid state at 150° C., from among the materials B described above, is sealed in the interior of a bag-like structure made up of a material having a melting point in the vicinity of 150° C., from among the materials A described above, the structure of the partition member being designed so that upon melting of part of the bag-like structure made up of the material A at 150° C., the material B sealed in the interior flows down out of the bag-like structure. The switching temperature of each partition member 1 in such a structure was set to 150° C., the initial thermal conductivity to 1.0 W/m·K and the thermal conductivity after switching to 0.10 W/m·K, and there were estimated the temperature inside each cell 2, as well as the surface average temperature and thermal resistance per unit area of each partition member 1.

Figure 10:
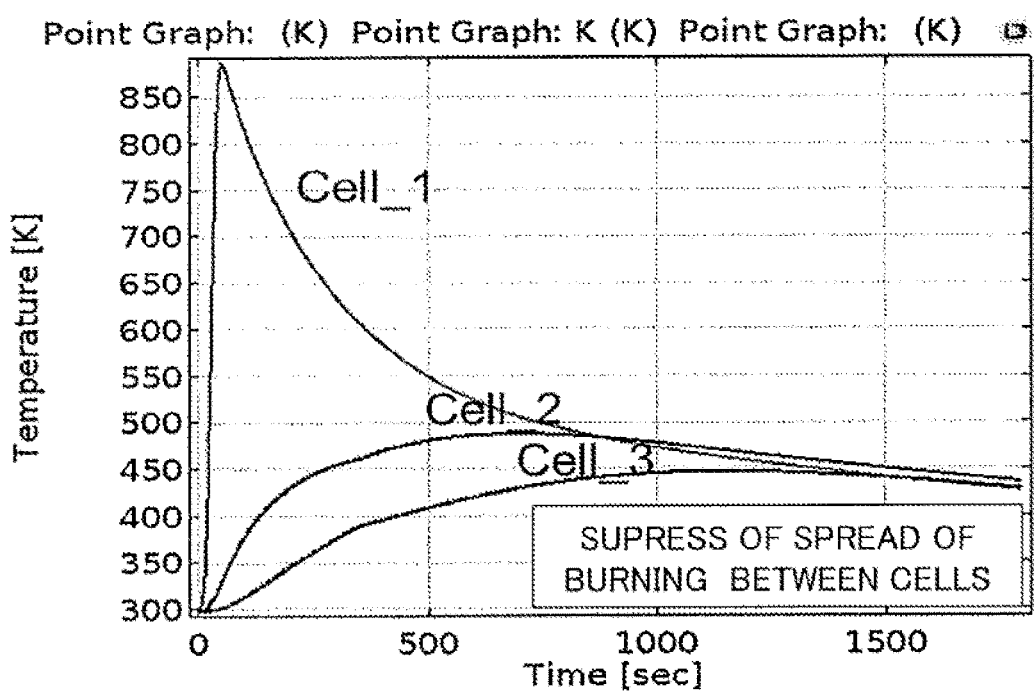
FIG. 10 is a graph illustrating changes in temperature in the interior of cells in Example 1.

FIG. 10 is a graph illustrating changes in temperature in the interior of the cells in Example 1. The vertical axis represents absolute temperature (K) in the interior of the cells 2, and the horizontal axis represents the time (seconds) elapsed since the cell 21 has reached an abnormal heating state. The graph reveals that after the cell 21 has reached an abnormal heating state, the temperature in the interior of the cell 22 and the cell 23 rises gradually, but does not reach an abnormal heating state, and converges at about 430K, which indicates that it is possible to suppress spread of burning between the cells 2.

FIG. 11 is a graph illustrating the evolution of surface average temperature of partition members in Example 1. The vertical axis represents the surface average temperature (° C.) of the partition members 1 and the horizontal axis represents the time (seconds) after the cell 21 has reached an abnormal heating state. It was estimated that immediately after the cell 21 reaches abnormal heating state the surface average temperature of the partition member 11 (Spacer 1) rises rapidly and exceeds 400° C., but the surface average temperature of the partition member 12 (Spacer 2) converges at about 160° C., without rising rapid.

FIG. 12 is a set of graphs illustrating the evolution of thermal resistance per unit area of the partition members in Example 1. The vertical represents thermal resistance per unit area ($m^2 \cdot K/W$) and the horizontal axis represents the surface average temperature (° C.) of the respective partition members 1. The value of thermal resistance per unit area ($\theta_1$) at a surface average temperature of 190° C. of the partition member 11 (Spacer 1) and of the partition member 12 (Spacer 2) was $1.0 \times 10^{-2}$ $m^2 \cdot K/W$, and the value of thermal resistance per unit area ($\theta_2$) at an average temperature of 70° C. was $1.0 \times 10^{-3}$ $m^2 \cdot K/W$. That is, the partition members 1 in Comparative example 1 satisfy the conditions of both (Expression 1) and (Expression 2) described above pertaining to thermal resistance per unit area.

Comparative Example 2

With a view to bearing out the importance of the switching function of the partition members 1, Comparative example 2 and Comparative example 3 illustrate examples envisaging partition members 1 not having a switching function. In Comparative example 2 the partition members 1 are assumed to be partition members 1 of lower thermal conductivity than that in Comparative example 1, with thickness set to 1.0 mm and thermal conductivity set to 0.10 W/m·K. Various conditions pertaining to the bus bars 3 and the case 4 were set to be identical to those in Comparative example 1.

Figure 13:
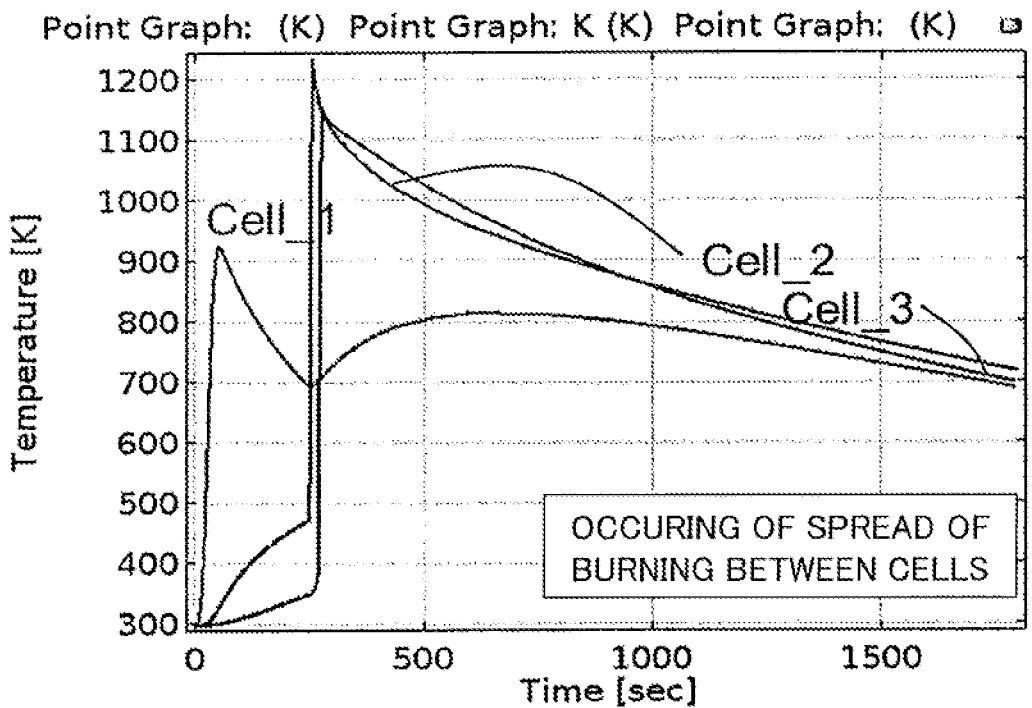
FIG. 13 is a graph illustrating changes in temperature in the interior of cells in Comparative example 2.

FIG. 13 is a graph illustrating changes in temperature in the interior of the cells in Comparative example 2. The vertical axis represents absolute temperature (K) in the interior of the cells 2, and the horizontal axis represents the time seconds) elapsed since the cell 21 has reached an abnormal heating state. The graph indicated that the time required for the occurrence of spread of burning from the abnormally heated 21 to the cell 22 and cell 23 was herein longer than that in Comparative example 1, in which partition members 1 made of a general resin were used, but there was not achieved suppression of the spread of burning.

Figure 14:
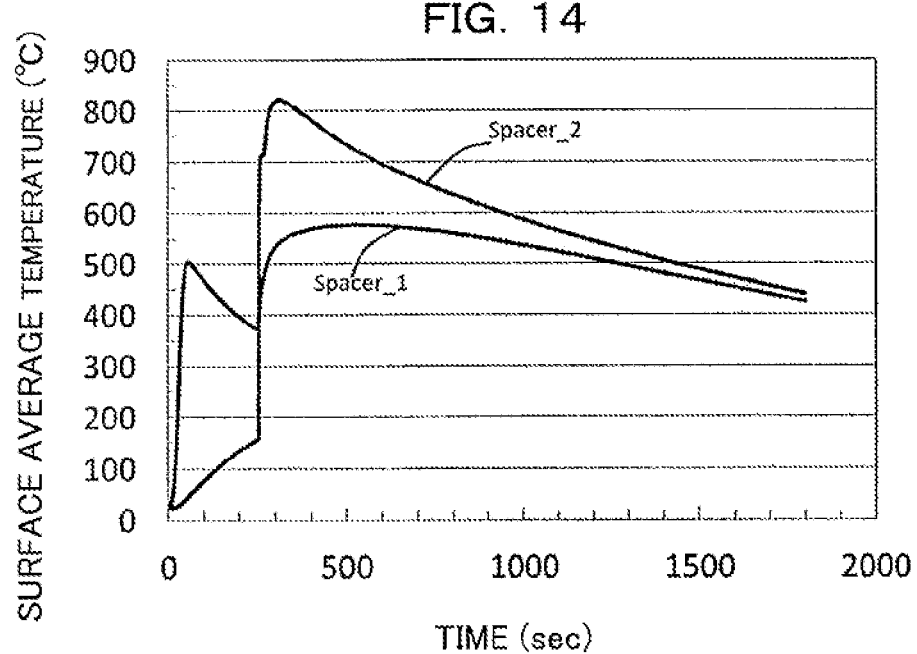
FIG. 14 is a graph illustrating the evolution of surface average temperature of partition members in Comparative example 2.

FIG. 14 is a graph illustrating the evolution of the surface average temperature of partition members in Compare Comparative example 2. The vertical axis represents the surface average temperature (° C.) of partition members 1 and the horizontal axis represents the time (seconds) after the cell 21 has reached an abnormal heating state. The surface average temperature of the partition member 11 (Spacer 1) began rising about 250 seconds after the cell 21 reached an abnormal heating state. From these results it was estimated that in a case where the thermal insulation properties of the members 1 is enhanced, the heat generated by the cell 21 is not eliminated efficiently, at an initial stage where the cell 21 has reached the abnormal heating state and as a result spread of burning is not suppressed.

Figure 15:
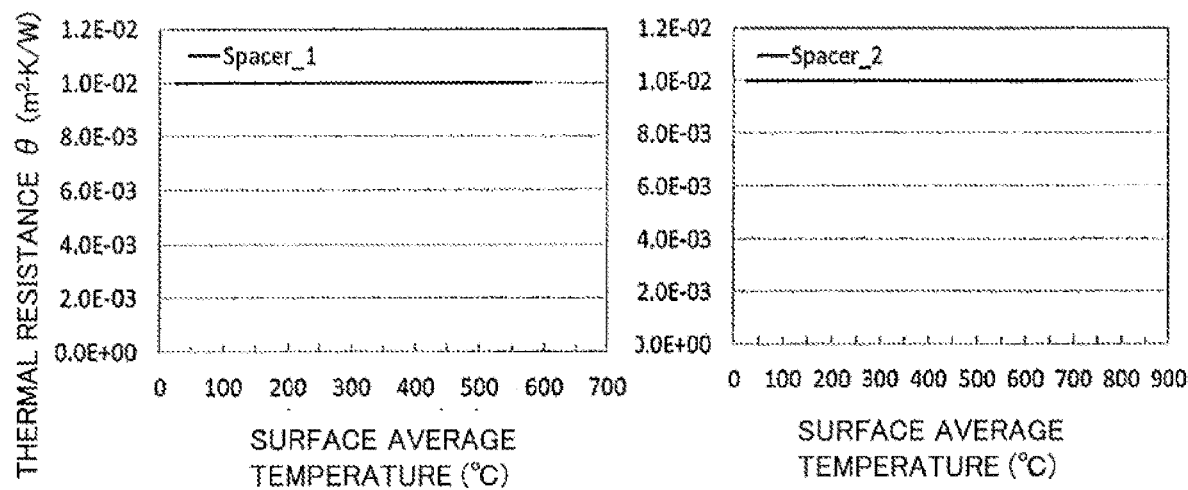
FIG. 15 is a set of graphs illustrating the evolution of thermal resistance of partition members in Comparative example 2.

FIG. 15 is a set of graphs illustrating the evolution of thermal resistance per unit area of the partition members in Comparative example 2. The vertical axis represents thermal resistance per unit area ($m^2 \cdot K/W$) and the horizontal axis represents the surface average temperature of the respective partition members 1. The value of thermal resistance per unit area ($\theta_1$) at a surface average temperature of 190° C. of the partition member 11 (Spacer 1) and of the partition member 12 (Spacer 2) was $1.0 \times 10^{-2}$ $m^2 \cdot K/W$, and the value of thermal resistance per unit area ($\theta_2$) at an average temperature of 70° C. was $1.0 \times 10^{-2}$ $m^2 \cdot K/W$. That is, the partition members 1 in Comparative example 2 satisfy the condition of (Expression 1) described above pertaining to thermal resistance per unit area, but not the condition of (Expression 2).

Comparative Example 3

In Comparative example 3 the partition members 1 are assumed to be partition members 1 of higher thermal conductivity than that in Comparative example 1, with thickness set to 1.0 mm and thermal conductivity set to 1.0 W/m·K. Various conditions pertaining to the bus bars 3 and the case 4 were set to be identical to those in Comparative example 1.

Figure 16:
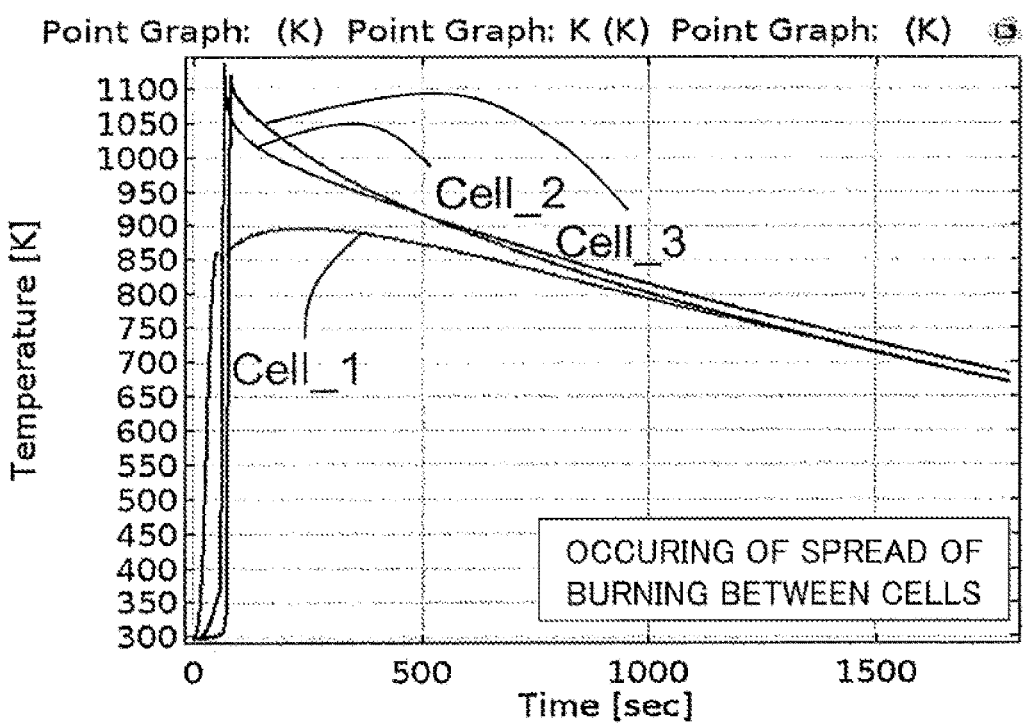
FIG. 16 is a graph illustrating changes in temperature in the interior of cells in Comparative example 3.

FIG. 16 is a graph illustrating changes in temperature in the interior of the cells in Comparative example 3. The vertical axis represents absolute temperature (K) in the interior of the cells and the horizontal axis represents the time (seconds) elapsed since the cell 21 has reached an abnormal heating state. The graph indicated that the time required for the occurrence of spread of burning from the abnormally heated cell 21 to the cell 22 and cell 23 was shorter than that in Comparative example 1, in which partition members 1 made of a general resin were used, and that the cell 22 and cell 23 underwent abnormal heating substantially simultaneously with cell 21.

Figure 17:
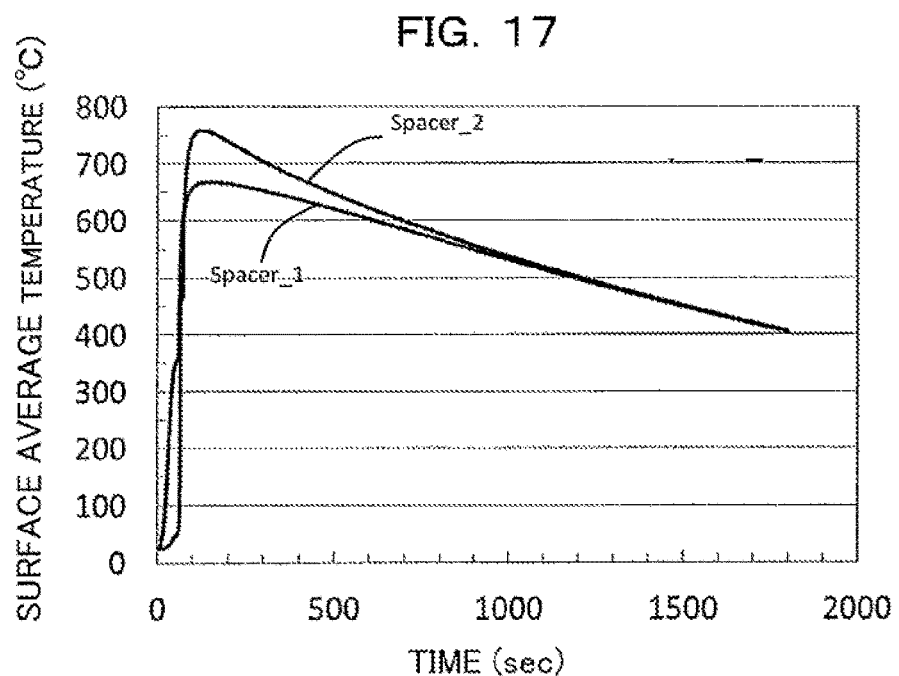
FIG. 17 is a graph illustrating the evolution of surface average temperature of partition members in Comparative example 3.

FIG. 17 is a graph illustrating the evolution of surface average temperature of partition members in Comparative example 3. The vertical axis represents the surface average temperature (° C.) of the partition members 1 and the horizontal axis represents the time (seconds) after the cell 21 has reached an abnormal heating state. It was estimated that immediately after the cell 21 reaches an abnormal heating state, the surface average temperatures of the partition member 11 (Spacer 1) and of the partition member 12 (Spacer 2) rise rapidly, and the surface average temperature of all the foregoing exceeds 600° C. by the time that 100 seconds have elapsed. From these results was estimated that in a case where heat transfer properties of the partition members 1 are improved, spread of burning cannot be suppressed given that heat generated upon abnormal heating of the cell 21 propagates quickly to the adjacent cell 22 and cell 23.

Figure 18:
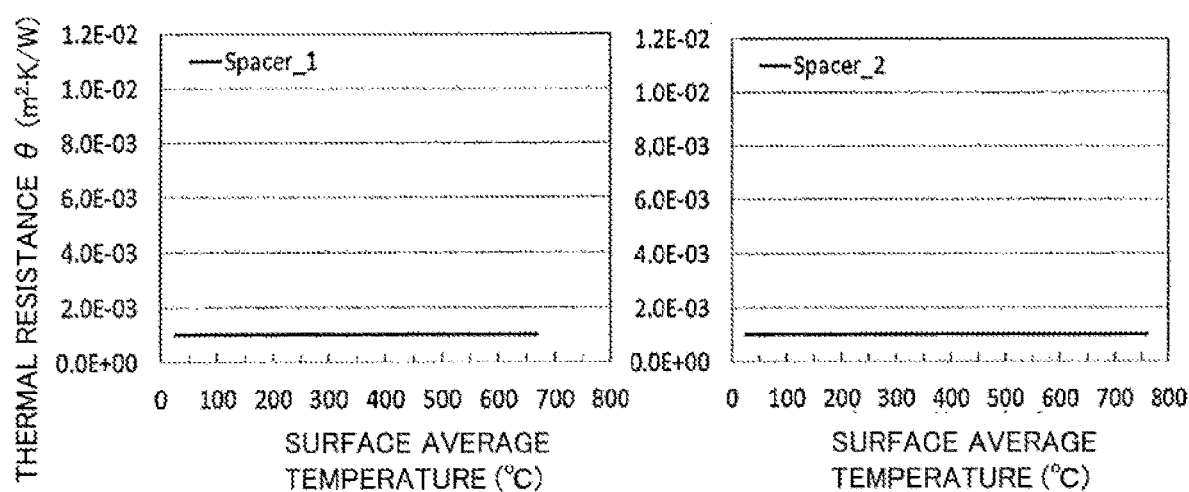
FIG. 18 is a set of graphs illustrating the evolution of thermal resistance of partition members in Comparative example 3.

FIG. 18 is a set of graphs illustrating the evolution of thermal resistance per unit area of the partition members in Comparative example 3. The vertical axis represents thermal resistance per unit area ($m^2 \cdot K/W$) and the horizontal axis represents the surface average temperature (° C.) of the respective partition members 1. The value of thermal resistance per unit area ($\theta_1$) at a surface average temperature of 190° C. of the partition member 11 (Spacer 1) and of the partition member 12 (Spacer 2) was $1.0 \times 10^3$ $m^2 \cdot K/W$, and the value of thermal resistance per unit area ($\theta_2$) at an average temperature of 70° C. was $1.0\times10^{-3}$ m²·K/W. That the partition members 1 in Comparative example 3 do not satisfy the condition of (Expression 1) described above pertaining to thermal resistance per unit area, but satisfy the condition of (Expression 2).

Comparative Example 4

Comparative example 4 provides an example in which even with high-performance partition members having a switching function with change in thermal conductivity, burning spreads from an abnormally heated cell to adjacent cells due to the fact that the value of thermal resistance per unit area before and after a change in thermal conductivity does not lie within an appropriate range.

In Comparative example 4 the partition members 1 were set to have a thickness of 1.0 mm, a switching temperature 150° C., an initial thermal conductivity of 0.24 W/m·K, and a thermal conductivity after switching of 0.10 W/m·K. Various conditions pertaining to the bus bars 3 and the case 4 were set to be identical those in Comparative example 1.

Figure 19:
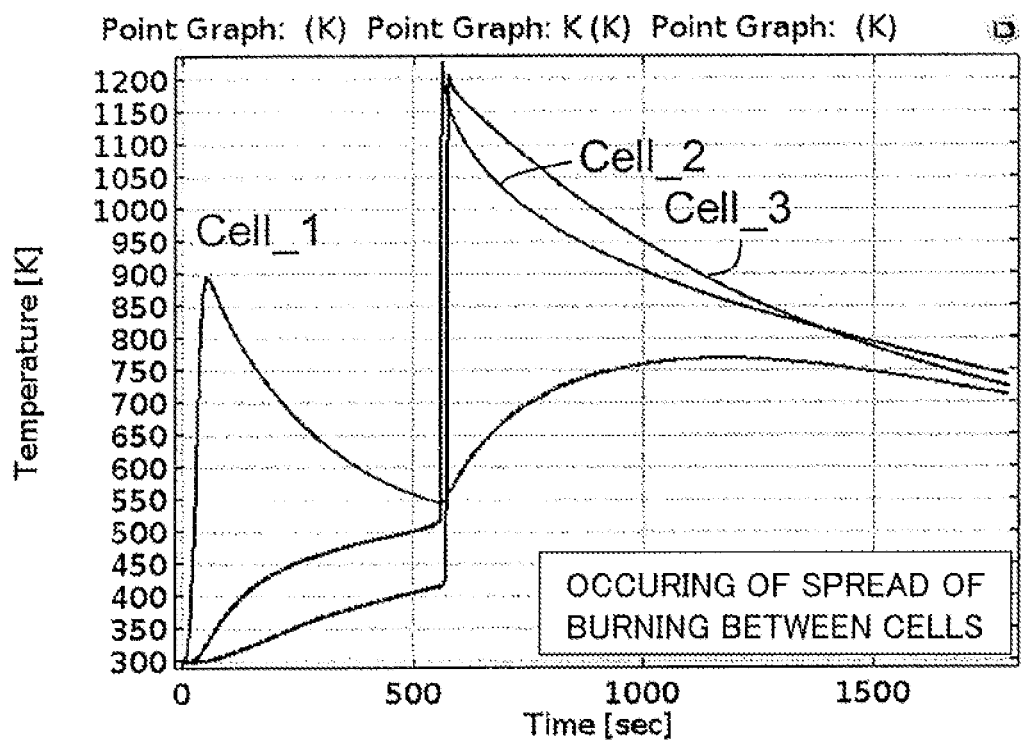
FIG. 19 is a graph illustrating changes in temperature in the interior of cells in Comparative example 4.

FIG. 19 is a graph illustrating changes in temperature in the interior of the cells in Comparative example 4. The vertical axis represents absolute temperature (K) in the interior of the cells 2, and the horizontal axis represents the time (seconds) elapsed since the cell 21 has reached an abnormal heating state. The graph suggests that after about 600 seconds have elapsed since the cell 21 reached an abnormal heating state, the temperature in the interior of the cell 22 and the cell 23 exceeds 1200K, with spreading of burning from the abnormally heated cell 21 to the cell 22 and the cell 23.

Figure 20:
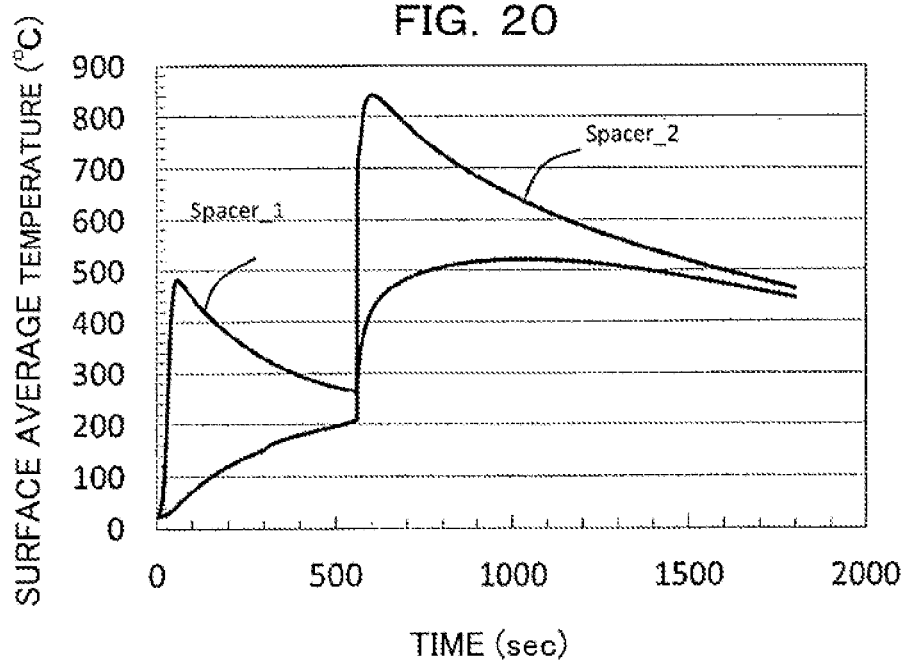
FIG. 20 is a graph illustrating the evolution of surface average temperature of partition members in Comparative example 4.

FIG. 20 is a graph illustrating the evolution of surface average temperature of partition members in Comparative example 4. The vertical axis represents the surface average temperature (° C.) of the partition members 1 and the horizontal axis represents the time (seconds) after the cell 21 has reached an abnormal heating state. It was estimated that immediately after the cell 21 reaches an abnormal heating state, the surface average temperature of the partition member 11 (Spacer 1) rises rapidly beyond 400° C., and after about 600 seconds have elapsed, also the surface average temperature of the partition member 12 (Spacer 2) rises rapidly beyond 800° C. From the above results it was estimated that even when the partition members 1 have a switching function, spread of burning cannot be reduced unless the thermal conductivity of the partition members 1 is properly controlled.

Figure 21:
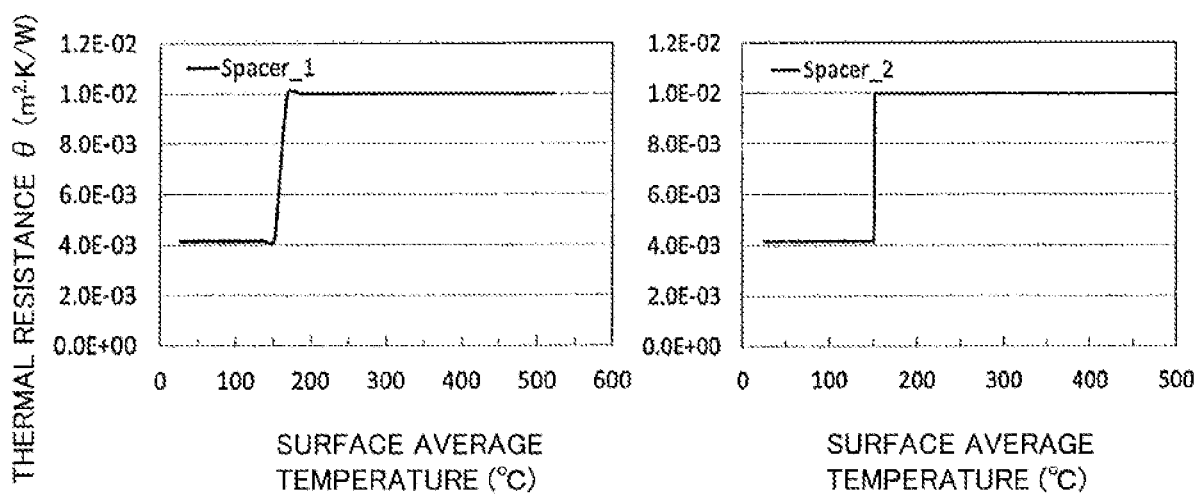
FIG. 21 is a set of graphs illustrating the evolution of thermal resistance of partition members in Comparative example 4.

FIG. 21 is a set of graphs illustrating the evolution of thermal resistance per unit area of the partition members in Comparative example 4. The vertical axis represents thermal resistance per unit area (m²·K/W) and the horizontal axis represents the surface average temperature (° C.) of the respective partition members 1. The value of thermal resistance per unit area ($\theta_1$) at a surface average temperature of 190° C. of the partition member 11 (Spacer 1) and of the partition member 12 (Spacer 2) was $1.0\times10^{-2}$ m²·K/W and the value of thermal resistance per unit area ($\theta_2$) at an average temperature of 70° C. was $4.2\times10^{-3}$ m²·K/W. That is, the partition members 1 in Comparative example 4 satisfy the condition of (Expression 1) described above pertaining to thermal resistance per unit area, but not the condition of (Expression 2).

What is claimed is:

1. A partition member which separates single cells that make up an assembled battery, the partition member comprising:

a bag structure made from a first material, the bag structure having a hollow interior and having two surfaces in a thickness direction, wherein the bag structure retains a second material within the hollow interior, wherein a thermal resistance of one of the two surfaces per unit area ($\theta_1$) of the bag structure in the thickness direction satisfies $\theta_1 \geq 5.0\times10^{-3}$ (m²·K/W) at a temperature greater than 180° C., wherein a thermal resistance of both of the two surfaces per unit area ($\theta_2$) of the bag structure in the thickness direction satisfies $\theta_2 \leq 4.0\times10^{-3}$ (m²·K/W) at a temperature below 80° C., and wherein the second material includes a substance that is in a fluid state that is liquid or other than liquid at 80° C. to 180° C.

2. The partition member according to claim 1, wherein an average temperature of one of the two surfaces exceeds 180° C.

3. The partition member according to claim 1, further comprising:

a support frame provided within the hollow interior of the bag structure configured to maintain a shape of the bag structure.

4. The partition member according to claim 3, wherein the support frame is a lattice structure and at least a portion of the lattice structure extends between the two surfaces in the thickness direction.

5. The partition member according to claim 4, wherein at least a portion of the lattice structure extends in a height direction of the partition member transverse to the thickness direction.

6. The partition member according to claim 1, wherein the thermal conductivity in the thickness direction is $2.0\times10^{-2}$ W/m·K or more and 2.0 W/m·K or less at an average temperature of 180° C. or higher for one of the two surfaces; and the thermal conductivity in the thickness direction is $5.0\times10^{-2}$ W/m·K or more and 50 W/m·K or less at an average temperatures of 80° C. or lower for both of the two surfaces.

7. An assembled battery, comprising:

a plurality of single cells including a first single cell, a second single cell and a third single cell;

a first partition member having a bag structure with a hollow interior and having two surfaces in a thickness direction, the bag structure retains a fluid within the hollow interior, the first partition member separating the first single cell from the second single cell; and a second partition member having a bag structure with a hollow interior and having two surfaces in a thickness direction, the bag structure retains a fluid within the hollow interior, the second partition member separating the second single cell from the third single cell, wherein the bag structure of the first and second partition member is made from a first material, wherein a them al conductivity of the bag structure changes when the surface temperature of the cell side reaches a predetermined temperature, and wherein when the second single cell deviates from a normal state due to heat from the first single cell having reached an abnormal heating state, the quantity of heat transmitted from the first single cell to the second single cell via the first partition member is reduced by the first partition member and the quantity of heat transmitted from the first single cell to the third single cell maintaining the normal state is not reduced by the second partition member.

8. The assembled battery according to claim 7, wherein the quantity of heat transmitted from the first single cell to the second single cell is reduced through an increase in the thermal resistance per unit area of the first partition member, and wherein even if the second single cell deviates from normal state, the then ial resistance per unit area of the second partition member does not increase and the quantity of heat transmitted from the first single cell to the third single cell is not reduced.

9. The assembled battery according to claim 7, further comprising:

a support frame provided within the hollow interior of the bag structure of each of the first partition member and the second partition member, the support frame is configured to maintain a shape of the bag structure.

10. The assembled battery according to claim 7, wherein the support frame is a lattice structure and at least a portion of the lattice structure extends between the two surfaces in the thickness direction.

11. The partition member according to claim 1, wherein the second material includes a substance that is in a fluid state that is liquid or other than liquid at 80° C. to 180° C. comprises water.

* * * * *